United States Patent
Du Pont-Thibodeau et al.

(10) Patent No.: US 11,863,808 B2
(45) Date of Patent: Jan. 2, 2024

(54) GENERATING MEDIA QUEUES BY MULTIPLE PARTICIPANTS

(71) Applicant: Amazon Technologies, Inc., Seattle, WA (US)

(72) Inventors: Catherine Du Pont-Thibodeau, Montreal (CA); Caleb Patrick Gross, Thornton, CO (US); Stephen Mardin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/705,724

(22) Filed: Mar. 28, 2022

(65) Prior Publication Data

US 2023/0308702 A1    Sep. 28, 2023

(51) Int. Cl.
| | |
|---|---|
| H04N 21/258 | (2011.01) |
| H04N 21/262 | (2011.01) |
| H04N 21/81 | (2011.01) |
| H04L 65/1089 | (2022.01) |
| H04L 9/40 | (2022.01) |

(52) U.S. Cl.
CPC ..... H04N 21/26258 (2013.01); H04L 63/101 (2013.01); H04L 65/1089 (2013.01); H04N 21/25891 (2013.01); H04N 21/8113 (2013.01)

(58) Field of Classification Search
CPC .......................... H04N 21/26258; G06F 16/40
See application file for complete search history.

(56) References Cited

U.S. PATENT DOCUMENTS

| | | | |
|---|---|---|---|
| 2010/0228740 A1 | 9/2010 | Cannistraro et al. | |
| 2014/0115461 A1* | 4/2014 | Reznor | H04N 21/41407 |
| | | | 715/716 |
| 2015/0153998 A1* | 6/2015 | Megias | H04N 21/26258 |
| | | | 700/94 |
| 2016/0294896 A1* | 10/2016 | O'Driscoll | G06F 16/4387 |
| 2017/0118500 A1* | 4/2017 | Carroll | H04N 21/4825 |
| 2018/0004714 A1* | 1/2018 | Munoz | G06F 40/169 |

(Continued)

OTHER PUBLICATIONS

Spotify.com, "Collaborative Playlists," available at https://supportspotify.com/us/article/collaborative-playlists/ (dated Mar. 15, 2022), 4 pages.

(Continued)

*Primary Examiner* — Hsiungfei Peng
(74) *Attorney, Agent, or Firm* — Athorus, PLLC

(57) ABSTRACT

A queue or media queue of music is generated by multiple listeners for playing by one or more devices. Listeners may select music using user interfaces rendered by their respective devices, and rank or vote to determine an order in which the music is played in accordance with the queue or media queue. Where a song or another media entity is accessible at a premium or only with a subscription, and one of the multiple listeners is not authorized to access the song, an unauthorized listener may be invited to purchase a subscription, or a substitute song may be selected for the unauthorized listener. Once a queue or media queue has been generated, music may be played in accordance with the queue or media queue by a single device in the presence of the multiple listeners, or by multiple devices each having any number of listeners within a vicinity.

20 Claims, 26 Drawing Sheets

(56) References Cited

U.S. PATENT DOCUMENTS

2020/0411052 A1* 12/2020 Manning .............. G06Q 10/101
2022/0295133 A1* 9/2022 Detrick ................ H04N 21/218

OTHER PUBLICATIONS

International Search Report & Written Opinion dated Jun. 16, 2023 in corresponding International Application No. PCT/US2023/064429.

Johnson, Elle: "How to Play Spotify on Multiple Devices Simultaneously? Solved!", www.audkit.com, AudKit, Dec. 10, 2021 (Dec. 10, 2021), XP002809295, Retrieved from the Internet: URL: https://www.audkit.com/spotify-music/spotify-on-multiple-devices.html [retrieved on May 15, 2023] the whole document.

Picaro, Elyse Betters: "How to create collaborative playlist on Spotify", www.pocket-lint.com, Pocket-lint.com, Oct. 15, 2021 (Oct. 15, 2021), XP002809296, Retrieved from the Internet:URL:https://www.pocket-lint.com/apps/news/spotify/154185-how-to-create-a-collaborative-playlist-on-spotify/ [retrieved on May 15, 2023] the whole document.

* cited by examiner

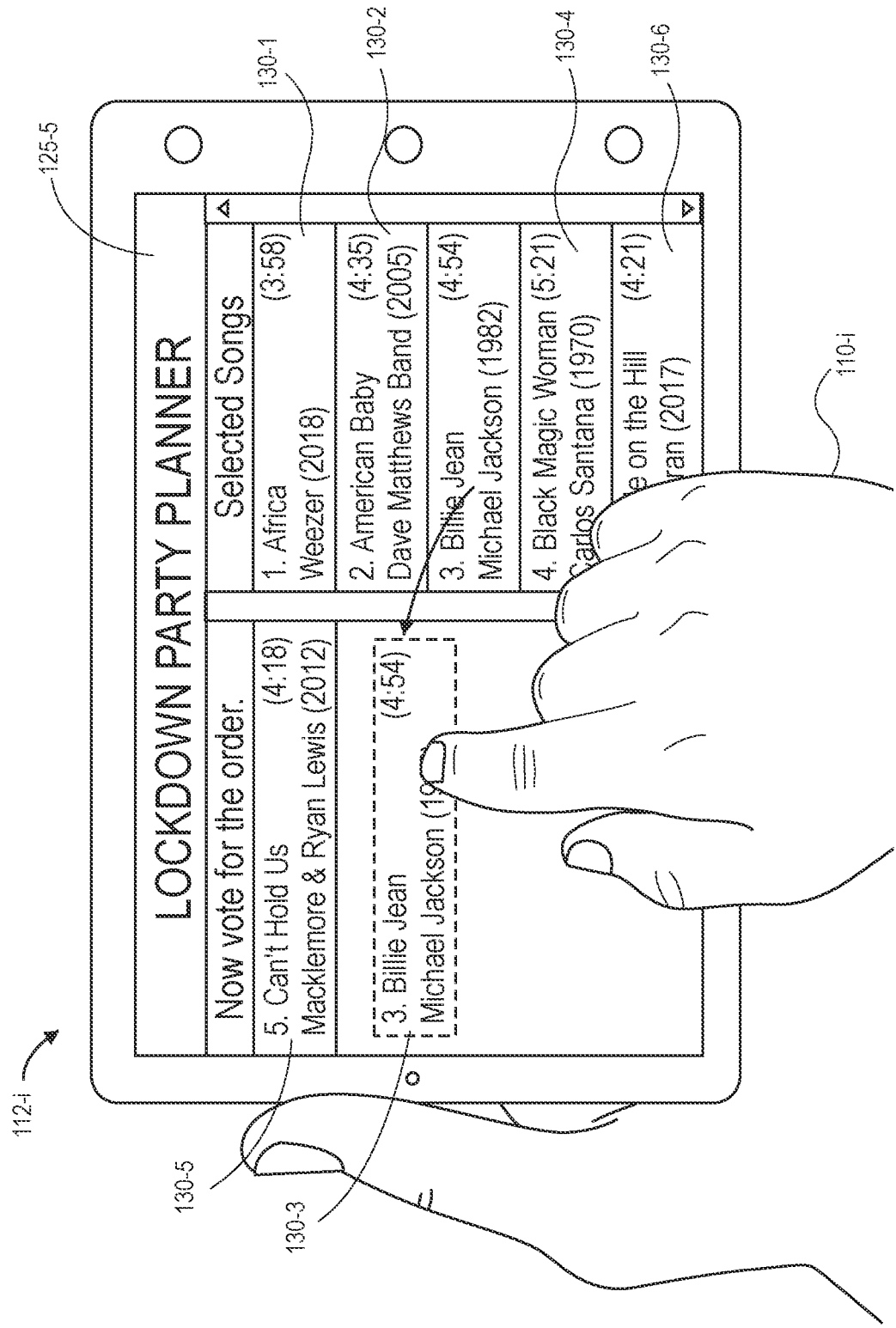

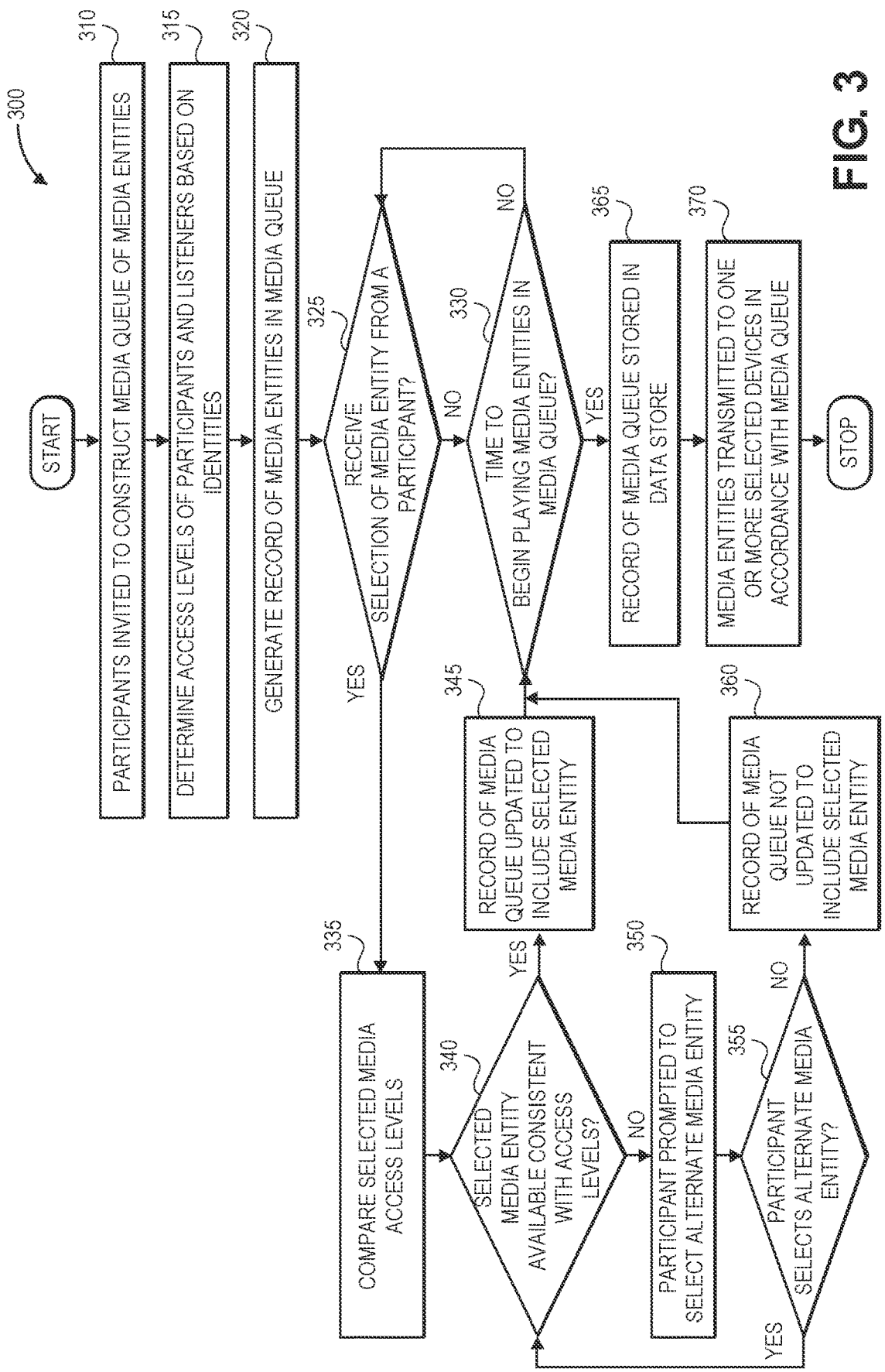

GENERATING MEDIA QUEUES BY MULTIPLE PARTICIPANTS

BACKGROUND

Many people enjoy listening to music together in groups. Since the advent of the LP record following World War II, families and friends have routinely chosen to play recorded music as accompaniments to meals or gatherings, or generally during leisure time. As media on which music may be recorded has evolved from analog records imprinted upon vinyl to banded magnetic tapes coiled in cassettes to digital laser-formed discs, or vanished into a virtual "cloud," and as devices for playing media have become not only smaller but also more powerful and more portable, listeners may elect to play music in any number of environments and take music with them, if need be, to locations of their choosing. Listeners may enjoy music via televisions, media players, "smart speakers," mobile devices such as smart phones or tablet computers, wristwatches, headsets, or any number of other devices.

Many contemporary devices and techniques for playing music to groups of listeners are subject to a number of limitations, however. First, multiple participants are not typically capable of collaborating to construct a media queue including media entities or sets of media entities, such as music, in advance of a party or another occasion. For example, although an owner or operator of a device having music stored thereon or accessible thereto, or a subscriber to a media streaming account, may select and generate queues of songs or other media entities to be played in a specified order, the selection of the media entities and the generation of the media queue, or the selection of the specified order, is typically limited to a single person operating a single device under his or her control or possession. To invite collaboration on the generation of a queue, that person must either manually pass the single device having access to media entities or the account around to his or her friends, or invite such friends to sit at a keyboard or workstation of the device and make one or more selections accordingly. Alternatively, that person might share his or her credentials with such persons to log in or access media entities or streaming account, thereby risking a violation of a subscriber agreement or another term of service.

Second, even where collaboration on the generation of a media queue among multiple participants via a single device is possible, playing media entities in a queue on multiple devices in a synchronized manner is currently challenging, as the playing of the queue must typically begin from different devices at a synchronized time from their respective devices, a task that is difficult to coordinate where the participants are physically separated by extended distances. Third, where participants collaborate on the generation of a queue to be played on multiple devices in different locations, one or more media entities in the queue may be unsuitable for a listener, such as where the listener is not a subscriber to a source from which a media entity may be obtained, or where the listener simply does not enjoy or would prefer to not hear a media entity for any reason. Identifying a substitute media entity for that listener, or playing the substitute media entity in accordance with a queue, is a difficult task except in a rare instance where the media entity to be replaced and the substitute media entity have the same length or duration and can be readily substituted for one another without disrupting the playing of music of the queue.

BRIEF DESCRIPTION OF THE DRAWINGS

FIGS. 1A through 1J are views of aspects of one system for generating media queues in accordance with embodiments of the present disclosure.

FIG. 3 is a flow chart of one process for generating media queues in accordance with embodiments of the present disclosure.

DETAILED DESCRIPTION

As is set forth in greater detail below, the present disclosure is directed to systems and methods for generating media queues by multiple participants. More specifically, in some implementations, the present disclosure is directed to systems and methods for permitting two or more participants to collaborate in the generation of a media queue that includes multiple media entities, which may be songs, albums, artists, playlists or other sets or collections of media. Each participant may identify or propose to include one or more media entities in a media queue, and to weigh in (e.g., vote) on an order or sequence of the media entities in the media queue. Once a media queue has been defined to include media entities in an order or sequence, the media entities may be played from a single device within an acoustic range of all of the participants and any number of other listeners, or from multiple devices, each of which may be associated with one or more participants or listeners, and separated from one another by any distances, or are not in a common location. Moreover, a media queue may be updated from time to time by any number of participants, even as media entities of the media queue are being transmitted to devices of the participants and any listeners.

When a media queue has been defined to include media entities, and one or more of the media entities has been identified as unsuitable for a participant or a listener, such as where the participant or the listener is not a subscriber to a source of a media entity, or where the participant or the listener is known or believed to not prefer the media, a substitute media entity may be identified for that participant or listener, and another media queue that includes the substitute media entity may be generated. Where a substitute media entity has a different length or duration than a media entity for which the substitute media entity has been identified, either or both of the media queues may be further modified to accommodate the substitute media entity, and to ensure that the media queues may be played in a synchronized manner on different devices.

Figure 1A:
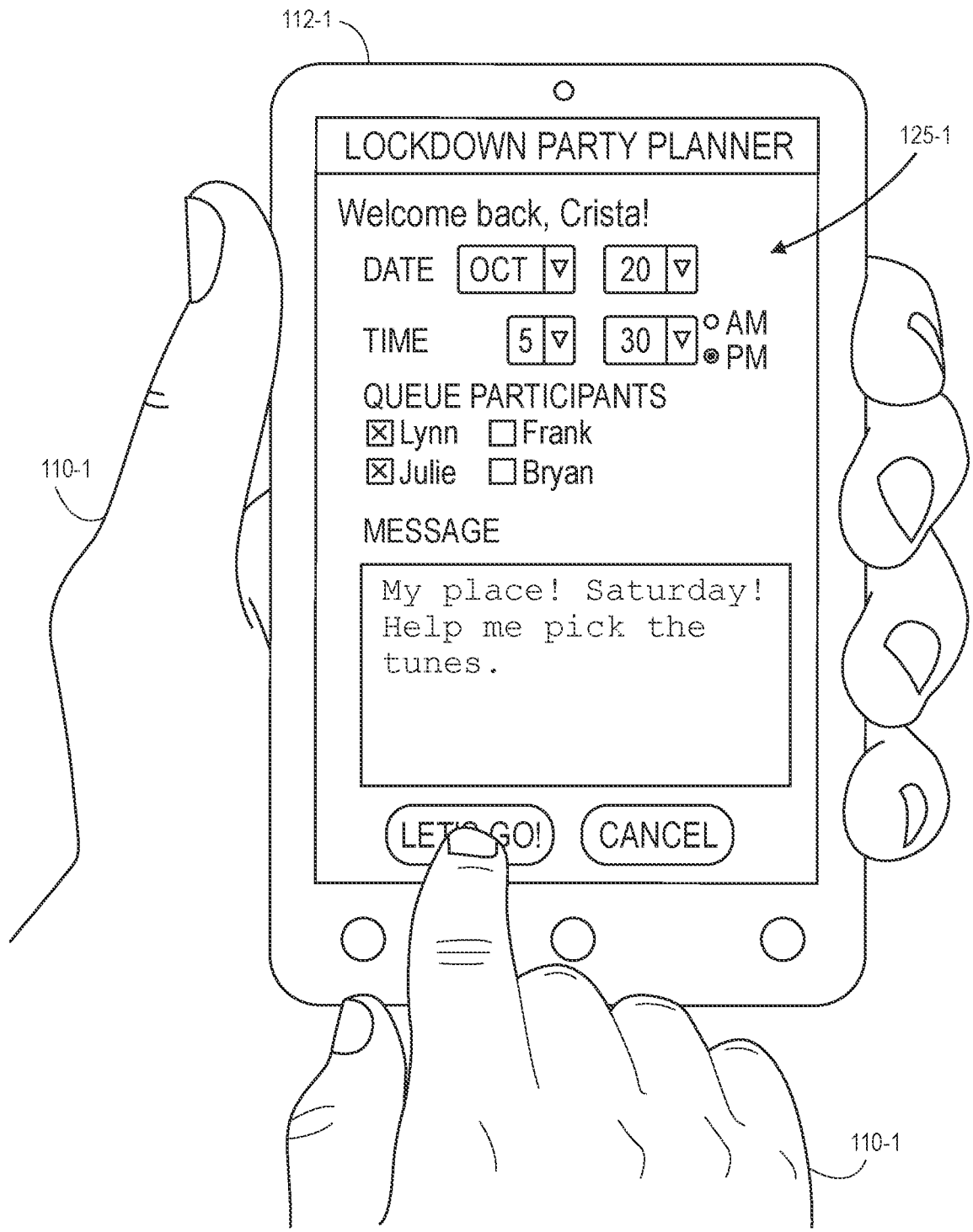

Referring to FIGS. 1A through 1J, views of aspects of one system 100 for generating media queues in accordance with embodiments of the present disclosure are shown. As is shown in FIG. 1A, a participant 110-1 (viz., "Crista")

operating a mobile device 112-1 (e.g., a smartphone, a tablet computer or another computer system) invites one or more family members, friends or other persons to be participants in the generation of a media queue for a party (or another event or occasion). The participant 110-1 executes one or more gestures or other interactions with a user interface 125-1 rendered by an interactive display of the mobile device 112-1, e.g., to invite one or more other participants 110-2, 110-3 (viz., "Lynn" and "Julie") to participate in the generation of the media queue, to select a date and a time for the party where the media queue is to be played, to identify a location of the party, or to provide any other information or data regarding the media queue to be generated for the party.

The user interface 125-1, or other user interfaces, may be rendered by executing code or other information or data programmed in any language, such as Hypertext Markup Language ("HTML"), Java, Kotlin, C #, or any other language. Such code may be configured for execution by any application (e.g., a general-purpose application, such as a browser, or a special-purpose application operating on the mobile device 112-1), a widget, an application programming interface, or any other application or feature, and by any operating system. The code may be executed by a widget, an application programming interface (or "API"), or any other application or feature of the mobile device 112-1.

In some implementations, the display of the mobile device 112-1, or other displays, may be a capacitive touchscreen, a resistive touchscreen, or any other system for receiving interactions by the participant 110-1, e.g., with a virtual keyboard (not shown), or in any other manner. Alternatively, or additionally, the participant 110-1 may interact with the user interface 125-1 or the mobile device 112-1 by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 112-1, or any other systems (not shown). In accordance with implementations of the present disclosure, the user interface 125-1, or other user interfaces, may include any number of buttons, text boxes, checkboxes, drop-down menus, list boxes, toggles, pickers, search fields, tags, sliders, icons, carousels, or any other interactive or selectable elements or features that are configured to display information to the creator 110 or to receive interactions from the participant 110-1 via the display of the mobile device 112-1.

Figure 1B:
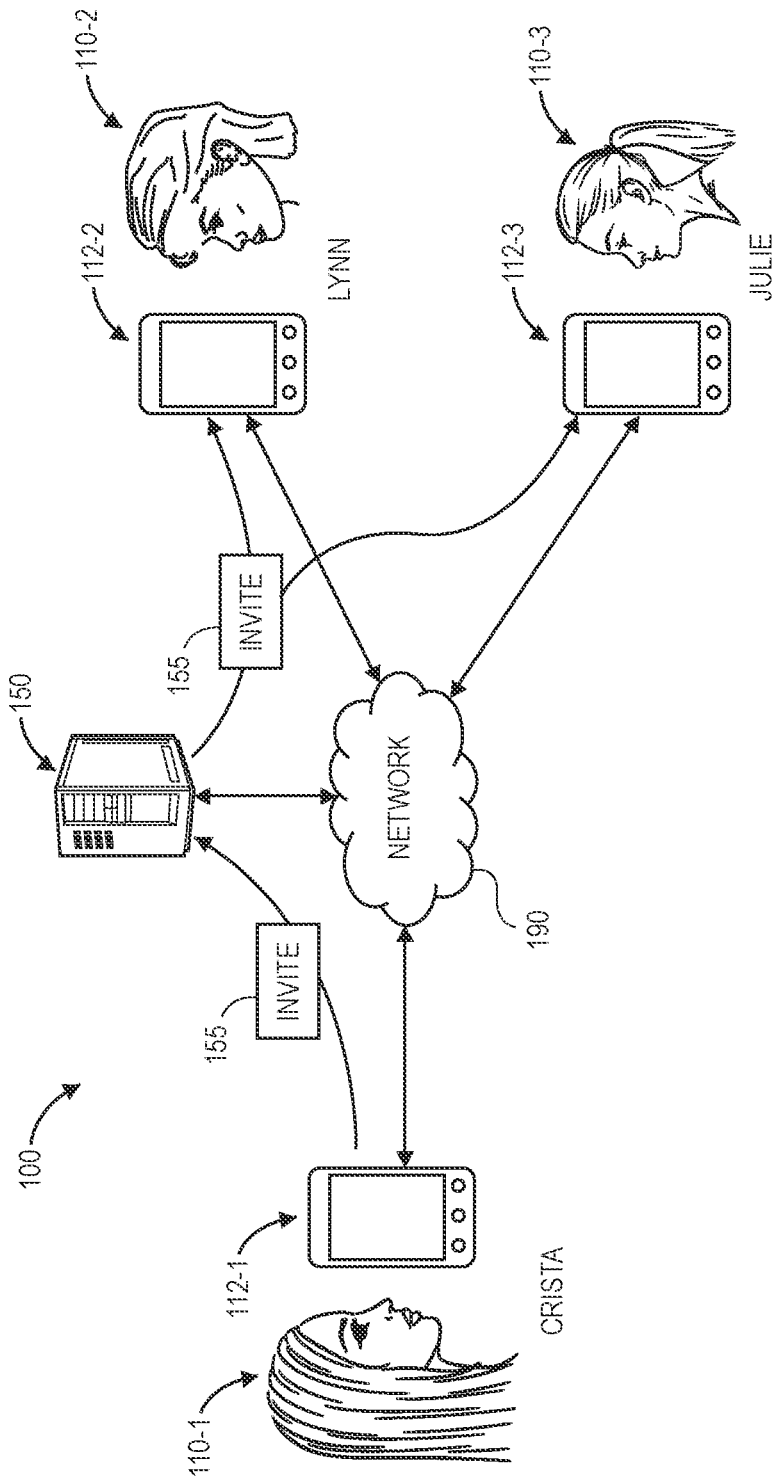

As is shown in FIG. 1B, information or data regarding an invitation 155 to participate in the generation of the media queue may be transmitted to a control system 150 (e.g., one or more servers or other computer systems) over one or more networks 190, which may include the Internet in whole or in part. The control system 150 may receive the information or data regarding the invitation 155, and store any or all of the information and data in one or more data stores, before transmitting code for presenting some or all of the information or data regarding the invitation 155 to mobile devices 112-2, 112-3 of the other invited participants 110-2, 110-3.

Figure 1C:
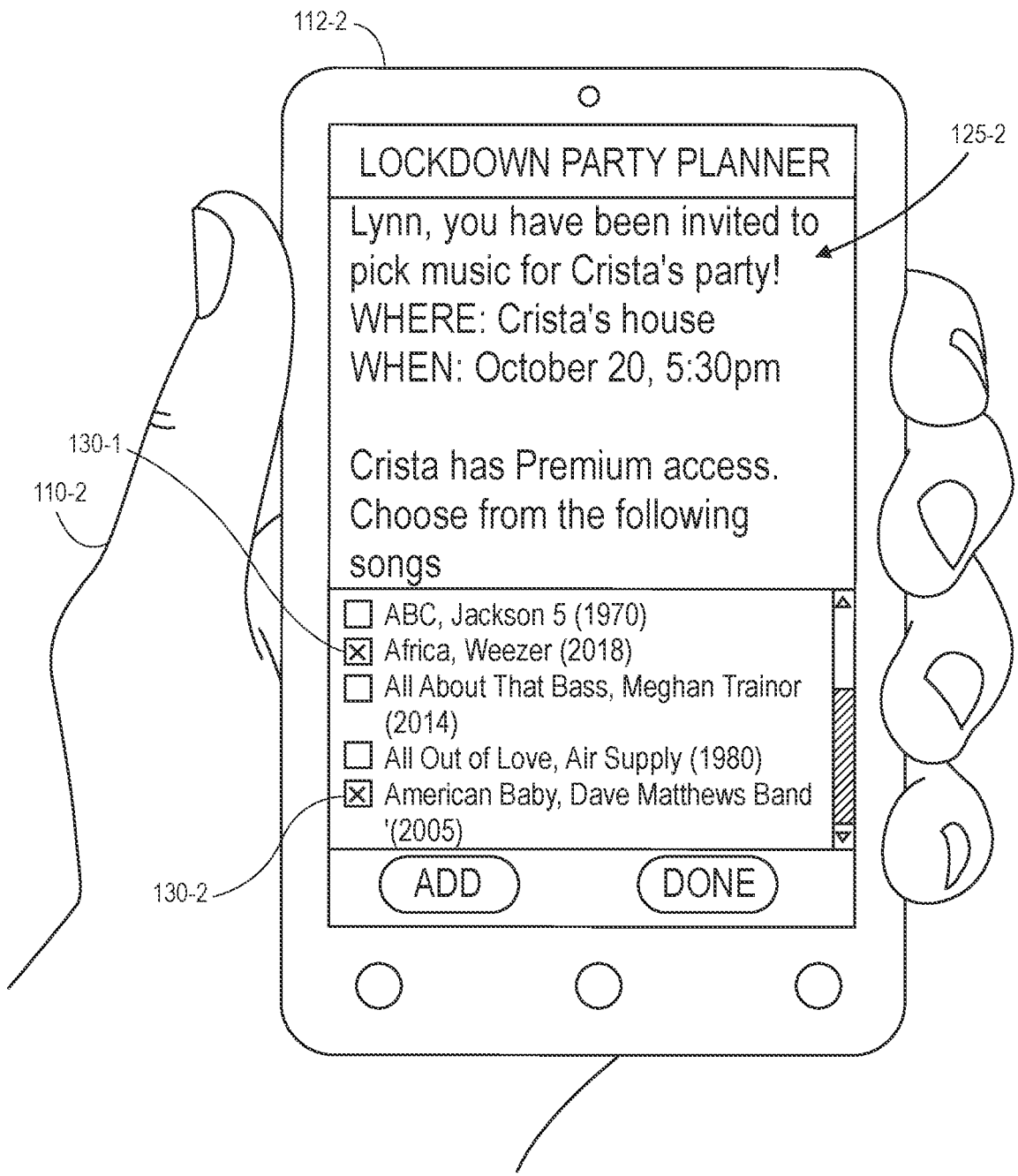

As is shown in FIG. 1C, the mobile device 112-2 of the participant 110-2 renders at least some of the information or data regarding the invitation 155 in a user interface 125-2 provided on an interactive display. For example, and as is shown in FIG. 1C, the user interface 125-2 invites the participant 110-2 to identify one or more songs or other media entities to be included in a media queue to be played at the party. The user interface 125-2 further indicates that the participant 110-1 who invited the participant 110-2 to select media entities for inclusion in the media queue has a premium level of access to media entities, e.g., access to a larger number or library of media entities, or to media entities that are of a higher level of quality than media entities available to participants having a lower level of access. Because the participant 110-1 is hosting the party at which the media queue will be played, the participant 110-2 may select media entities based on the premium level of access of the participant 110-1.

In some implementations, the participant 110-2 may select from any of the media entities that are available to those with the premium level of access by one or more interactions with the user interface 125-2, and one or more of such media entities may be displayed on the user interface 125-2. In some other implementations, media entities that are known or believed to be of interest to the participant 110-2 or the participants 110-1, 110-3, or any listeners, may be identified and recommended to the participant 110-2 on the user interface 125-2. The media entities shown in the user interface 125-2 may be selected for or recommended to the participant 110-2 on any basis.

As is shown in FIG. 1C, the participant 110-2 has selected a pair of songs 130-1, 130-2, including the song 130-1 "Africa" by the band Weezer, and the song 130-2 "American Baby" by the Dave Matthews Band. Information regarding the selections of the songs 130-1, 130-2 is transmitted by the mobile device 112-2 to the control system 150 over the one or more networks 190 upon one or more interactions with the user interface 125-2.

Figure 1D:
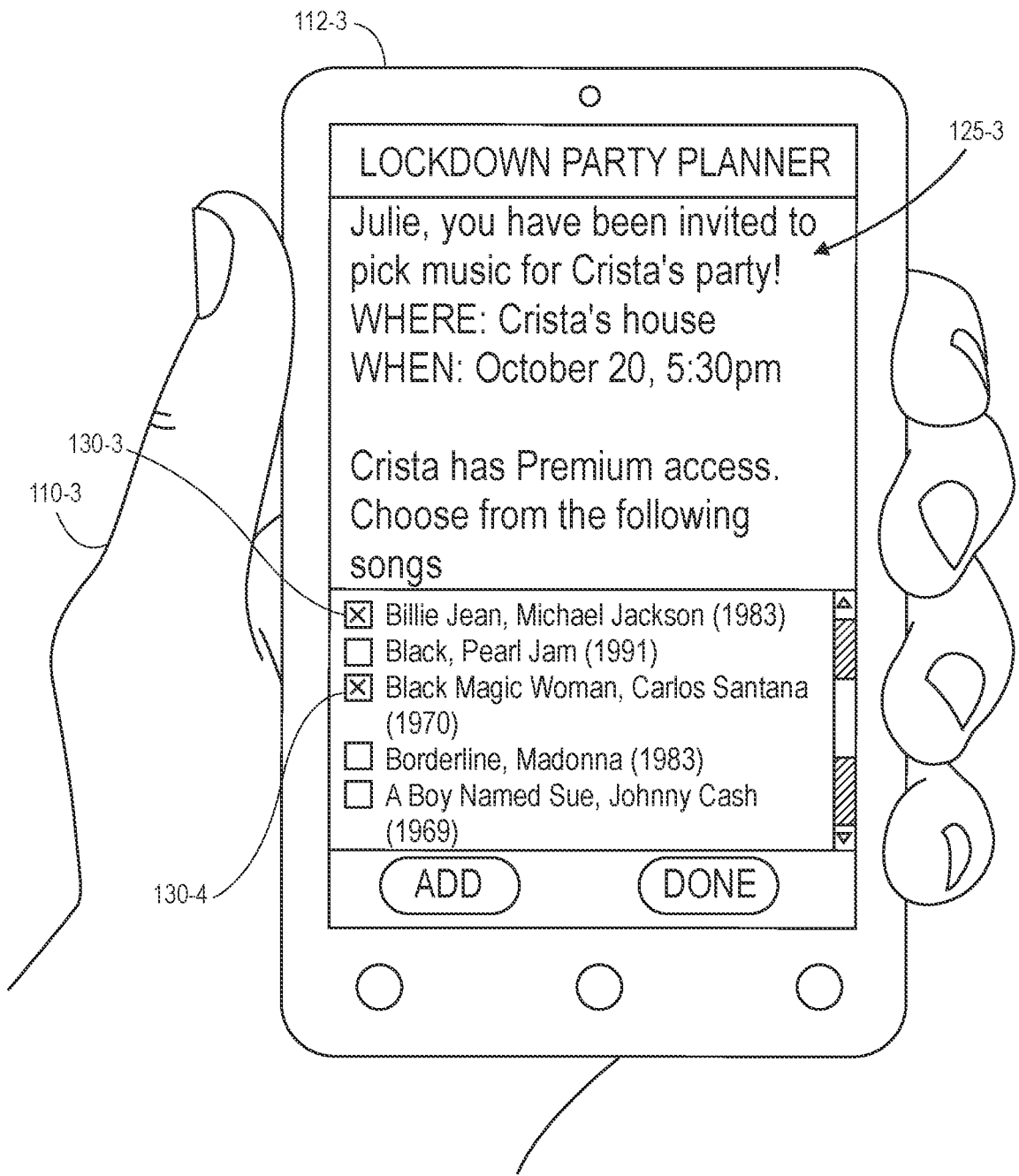

Similarly, as is shown in FIG. 1D, the mobile device 112-3 of the participant 110-3 renders at least some of the information or data regarding the invitation 155 in a user interface 125-3 provided on an interactive display. For example, and as is shown in FIG. 1D, the user interface 125-3 invites the participant 110-3 to identify one or more songs or other media entities to be included in the media queue, and indicates that the participant 110-1 who invited the participant 110-3 to select media entities for inclusion in the media queue has a premium level of access to media entities. The media entities shown in the user interface 125-3 may be selected for or recommended to the participant 110-3 on any basis.

As is shown in FIG. 1D, the participant 110-3 has selected a pair of songs 130-3, 130-4, including the song 130-3 "Billie Jean" by the artist Michael Jackson, and the song 130-4 "Black Magic Woman" by the artist Carlos Santana. Information regarding the selections of the songs 130-3, 130-4 is transmitted by the mobile device 112-3 to the control system 150 over the one or more networks 190 upon one or more interactions with the user interface 125-3.

Figure 1E:
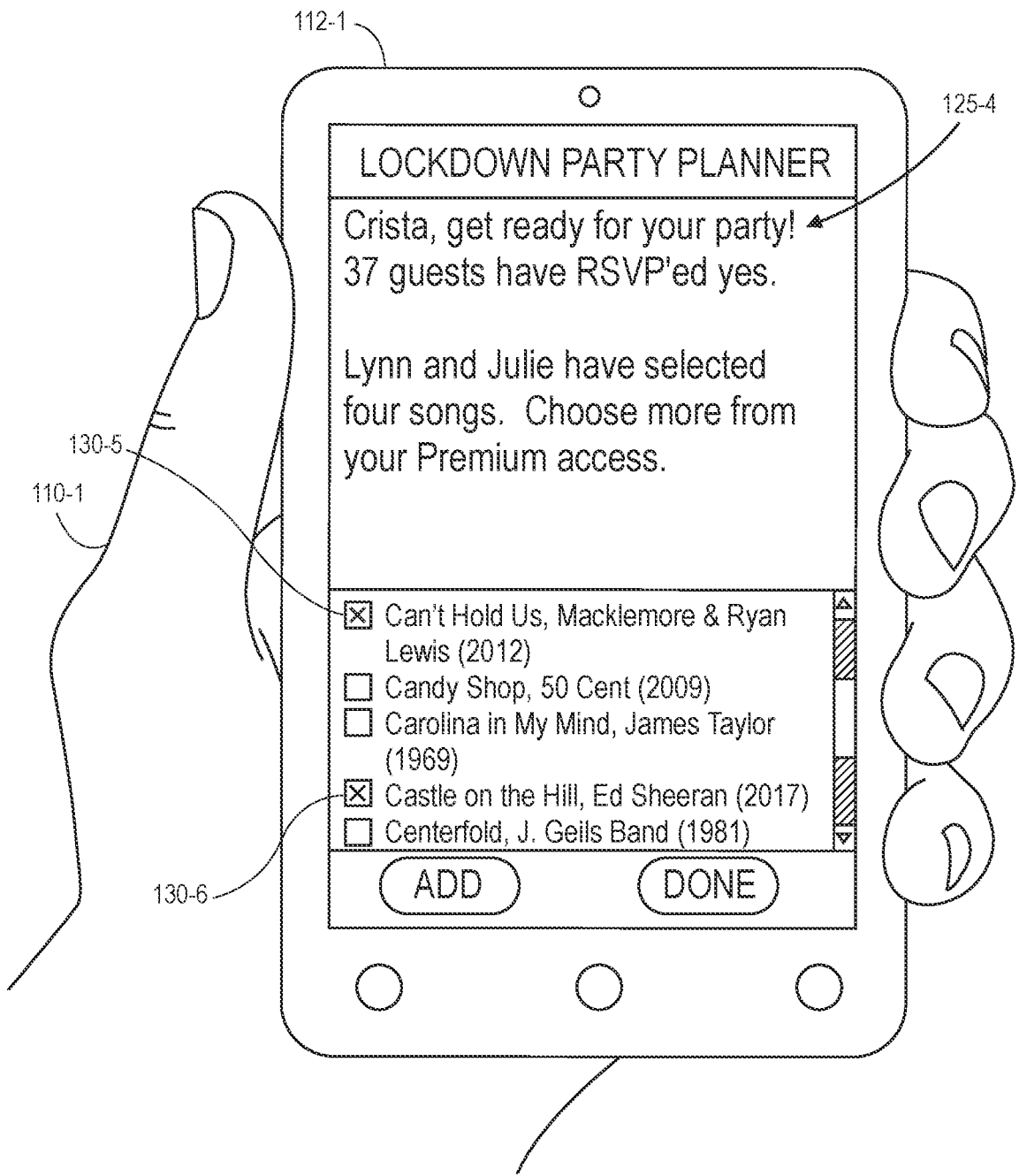

The participant 110-1 is also permitted to select songs or other media entities to be included in the media queue. As is shown in FIG. 1E, the mobile device 112-1 of the participant 110-1 renders information regarding a number of guests who have expressed an interest in attending the party, and identifies a number of songs selected by the participants 110-2, 110-3 in attending the party in a user interface 125-4. The media entities shown in the user interface 125-4 may be selected for or recommended to the participant 110-1 on any basis. As is shown in FIG. 1E, the participant 110-1 has selected a pair of songs 130-5, 130-6, including the song 130-5 "Can't Hold Us" by Macklemore & Ryan Lewis, and the song 130-6 "Castle on the Hill" by the artist Ed Sheeran.

Figure 1F:
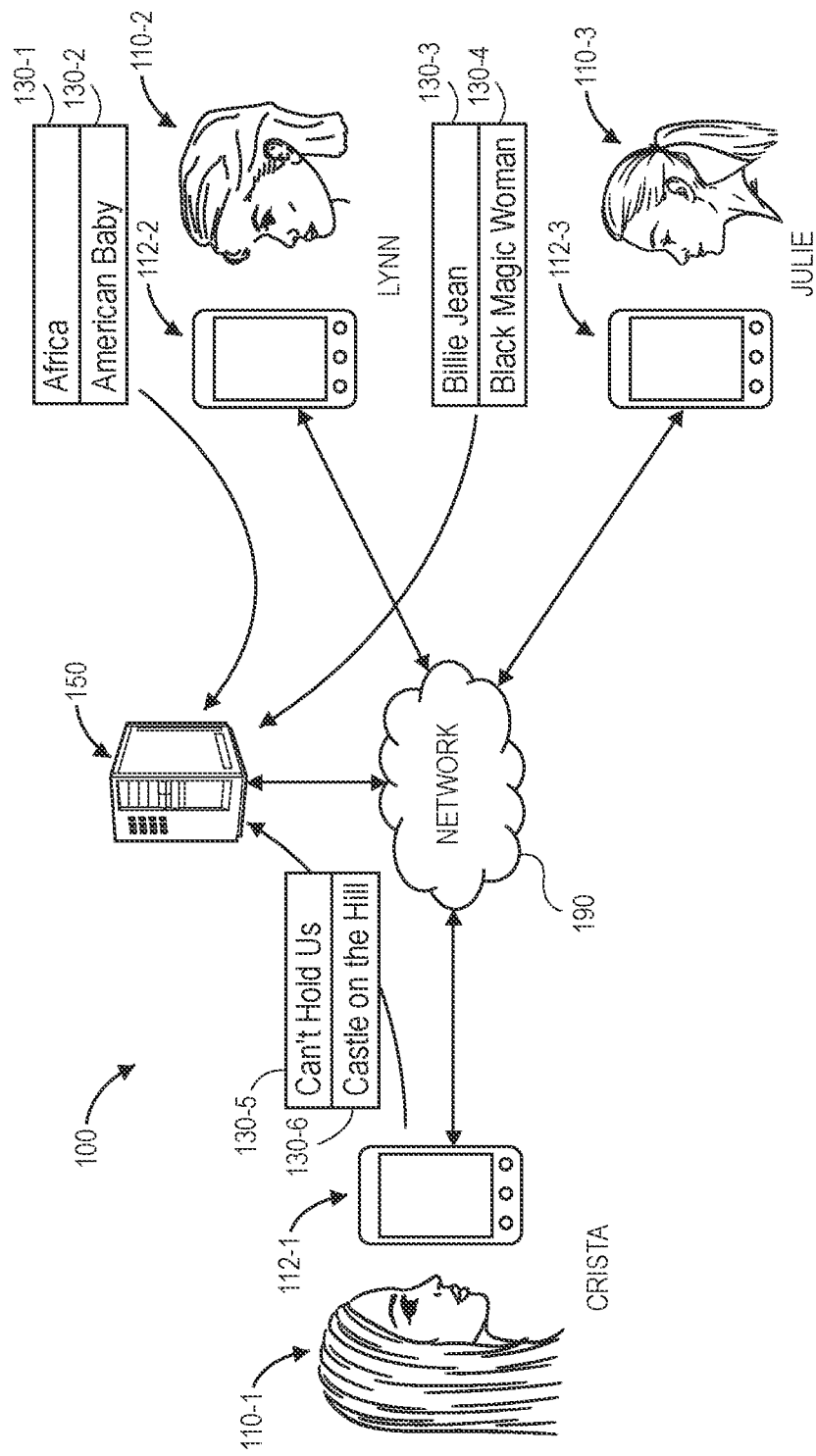
Figure 1G:
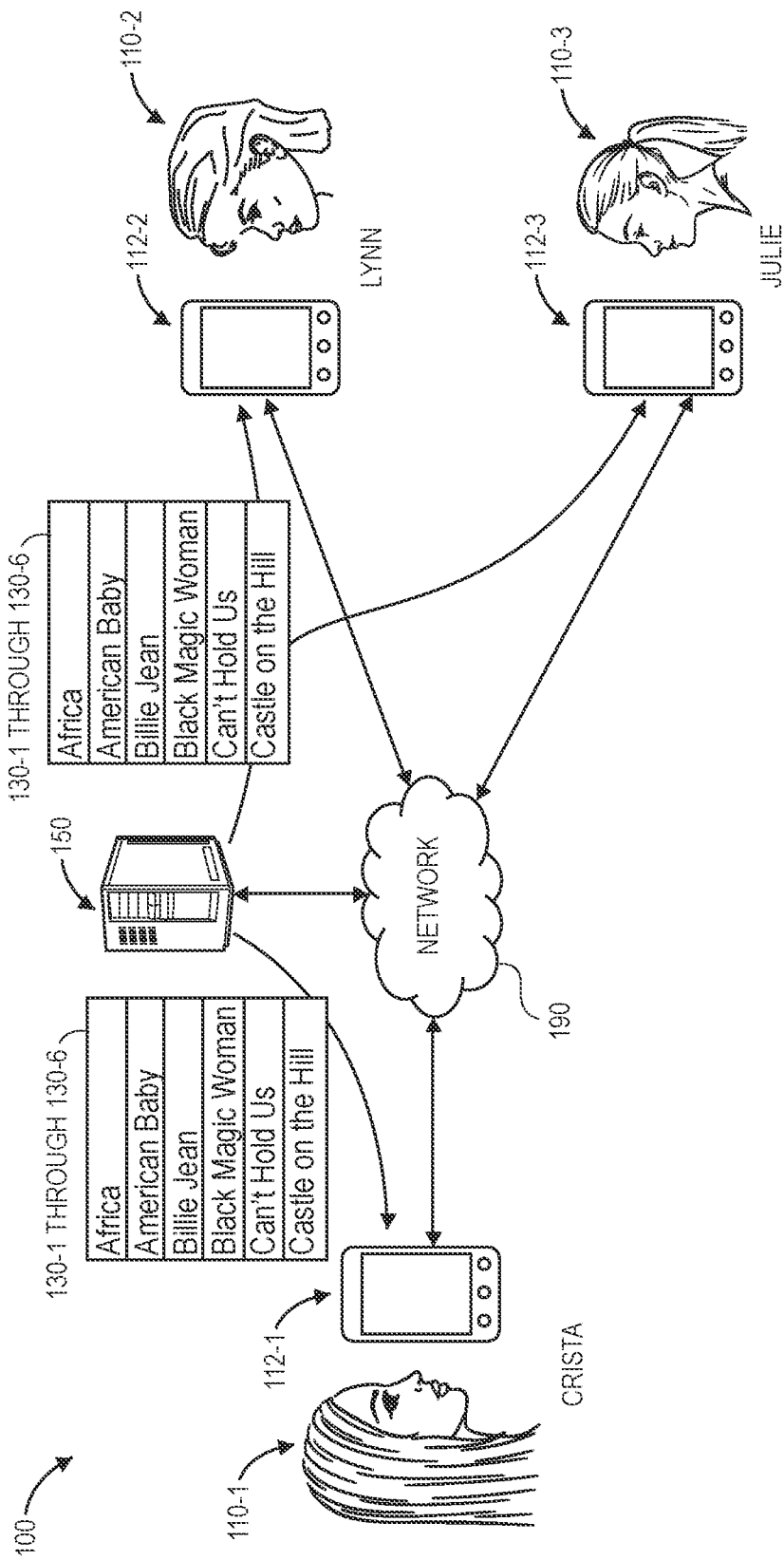
Figure 11:
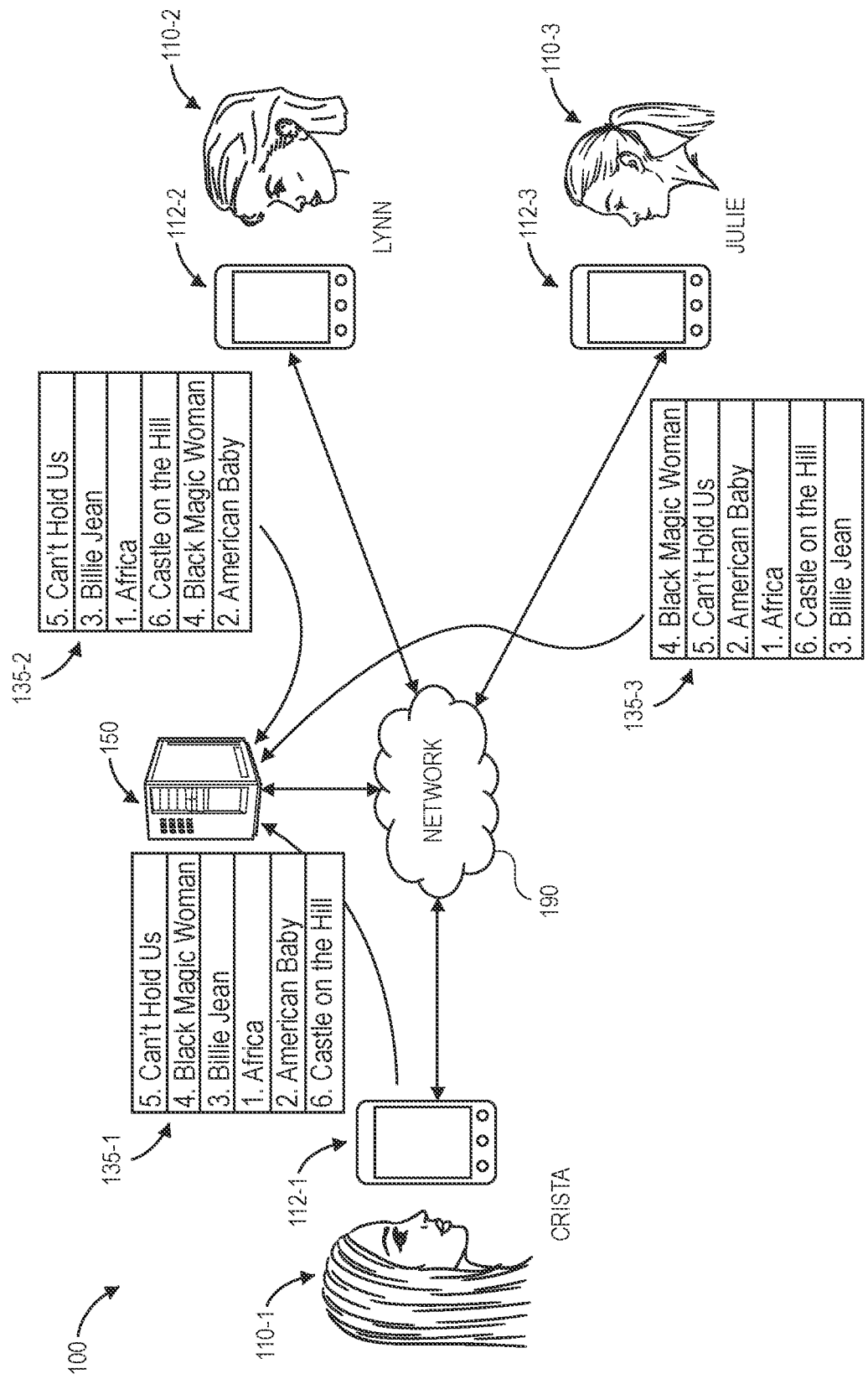

As is shown in FIG. 1F, information regarding the selections of the songs 130-1, 130-2 by the participant 110-2, the selections of the songs 130-3, 130-4 by the participant 110-3, and the selections of the songs 130-5, 130-6 by the participant 110-1 is transmitted by the mobile devices 112-1, 112-2, 112-3 to the control system 150 over the one or more networks 190. As is shown in FIG. 1G, the control system 150 then transmits information regarding all of the songs 130-1 through 130-6 selected by all of the participants 110-1, 110-2, 110-3 to the mobile devices 112-1, 112-2, 112-3, to enable each of the participants 110-1, 110-2, 110-3 to vote on or otherwise specify a preferred order in which the songs 130-1 through 130-6 are to be included in the media queue.

As is shown in FIG. 1H, a user interface 125-5 to be displayed on a representative device 112-1 of the devices 112-1, 112-2, 112-3 includes information or data identifying the songs 130-1 through 130-6 selected by the participants 110-1, 110-2, 110-3. The user interface 125-5 includes interactive or selectable elements or features corresponding to each of the songs 130-1 through 130-6 that may be selected or interacted with by each of the participants 110-1, 110-2, 110-3 in order to identify an order or sequence in which the participants 110-1, 110-2, 110-3 would prefer to hear the songs 130-1 through 130-6 in the media queue. For example, as is shown in FIG. 1H, a participant 110-1 of the participants 110-1, 110-2, 110-3 has selected and dragged an element corresponding to the song 130-5 to a portion of the user interface 125-5 in order to specify or vote for the song 130-5 to be played first in the media queue, e.g., by one or more gestures or other interactions with the user interface 125-5. As is also shown in FIG. 1H, the participant **110-*i* has selected and is dragging an element corresponding to the song 130-3 to the portion of the user interface 125-5 in order to specify or vote for the song 130-3 to be played second in the media queue. The participant 110-1 may continue until he or she has selected and dragged elements corresponding to each of the songs 130-1 through 130-6 into an order or sequence of his or her choosing. Alternatively, the participant 110-1 need not include all of the songs 130-1 through 130-6 in a preferred order or sequence, and may instead include fewer than all of the songs 130-1 through 130-6** into an order or sequence.

As is shown in FIG. 1I, orders 135-1, 135-2, 135-3 or sequences of the songs 130-1 through 130-6 that are selected by the respective participants 110-1, 110-2, 110-3 are received by the control system 150 from each of the devices 112-1, 112-2, 112-3. For example, each of the participants 110-1, 110-2, 110-3 may vote for or designate his or her orders 135-1, 135-2, 135-3 by one or more interactions with the user interface 125-5 on the respective devices or in any other manner. As is shown in FIG. 1I, the order 135-1 of songs preferred by the participant 110-1 begins with the song 130-5, followed by the song 130-4, the song 130-3, the song 130-1, the song 130-2 and the song 130-6. As is also shown in FIG. 1I, the order 135-2 of songs preferred by the participant 110-2 begins with the song 130-5, followed by the song 130-3, the song 130-1, the song 130-6, the song 130-4 and the song 130-2, while the order 135-3 of songs preferred by the participant 110-3 begins with the song 130-4, followed by the song 130-5, the song 130-2, the song 130-1, the song 130-6 and the song 130-3.

Figure 1J:
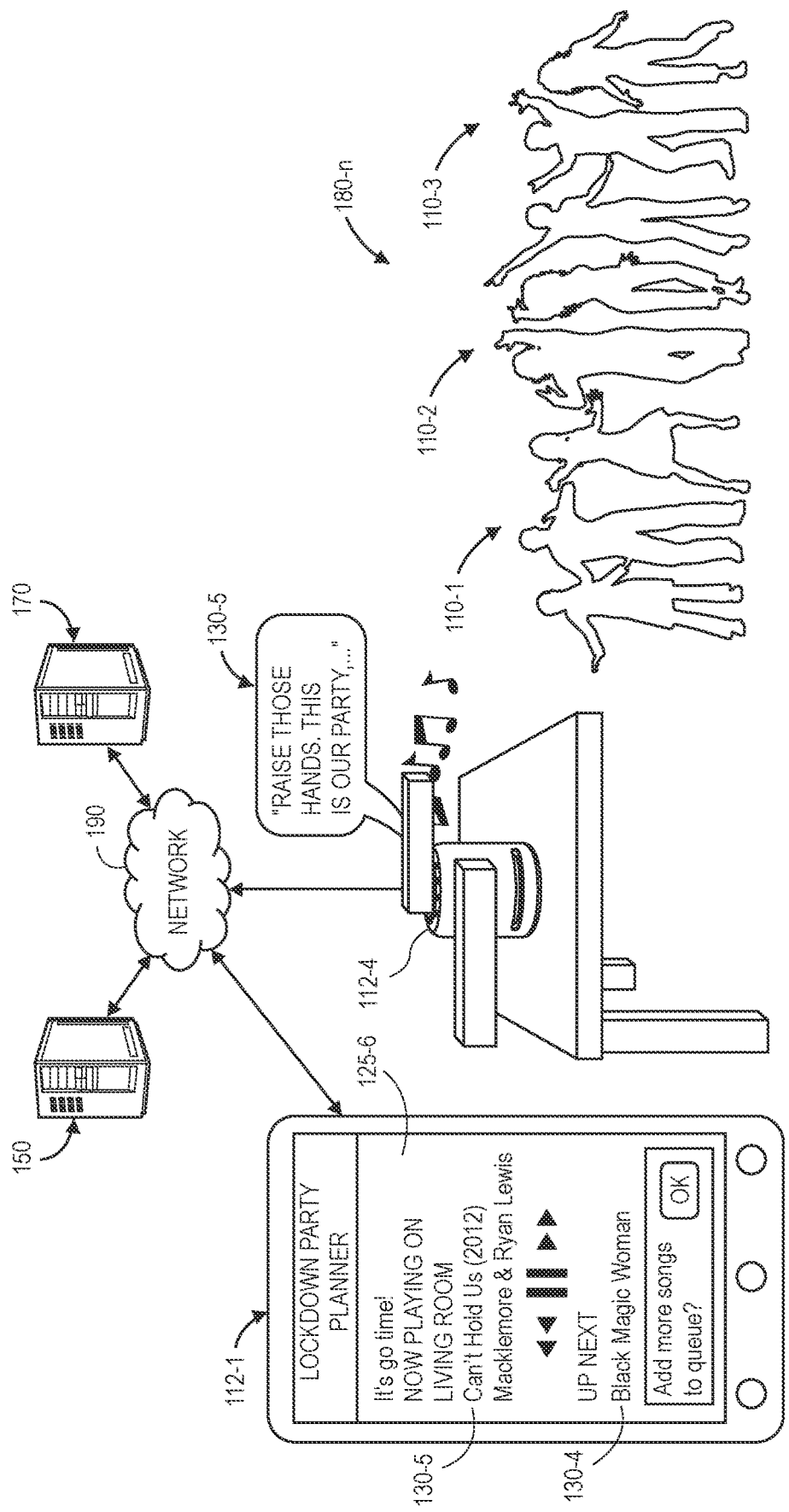

As is shown in FIG. 1J, beginning at a time at which the party is scheduled to start, the control system 150 causes data representing the songs 130-1 through 130-6 to be transmitted to a device 112-4 and played within a vicinity of the participants 110-1, 110-2, 110-3 and any number of other listeners **180-*n* (e.g., guests to the party other than the participants 110-1, 110-2, 110-3), in an order or sequence determined based on the orders 135-1, 135-2, 135-3, beginning with the song 130-5. The order or sequence in which the songs 130-1 through 130-6 to be played may be selected in any manner based on the orders 135-1, 135-2, 135-3**, such as by any voting mechanism or technique, which may be subject to one or more rules (e.g., limiting numbers of songs by the same artist or band that may be played consecutively).

The control system 150 may cause the songs 130-1 through 130-6 to be played by the device 112-4 in an order or sequence in any manner. For example, where data representing one or more of the songs 130-1 through 130-6 resides on or is stored in a data store or memory component of the device 112-4, the control system 150 may simply transmit one or more instructions to play the songs 130-1 through 130-6 in accordance with the order to the device 112-4 over the networks 190, e.g., individually at the respective times at which the songs 130-1 through 130-6 are to be played, or collectively, at a single time, or in a single instruction. Where data representing one or more of the songs 130-1 through 130-6 does not reside on or is not stored in any data store or memory component of the device 112-4, however, the control system 150 may cause the data to be transmitted to the device 112-4 over the networks 190 either directly or from a content source 170, e.g., a music catalog, a repository or a streaming service.

As is discussed above, because the participant 110-1 has a premium level of access, the songs 130-1 through 130-6 may be played by the device 112-4 and at the party regardless of whether any of the participants 110-1, 110-2, 110-3 or the listeners **180-*n* also has a premium level of access. Alternatively, in some implementations, each of the songs 130-1 through 130-6 may be compared to a level of access associated with the device 112-4 or any of the participants 110-1, 110-2, 110-3, in order to determine whether each of the songs 130-1 through 130-6 may be played by the device 112-4, or whether each of the participants 110-1, 110-2, 110-3 or the listeners 180-*n* also has access to or is authorized to hear the songs 130-1 through 130-6. In the event that the device 112-4 is not authorized to play any of the songs 130-1 through 130-6, or the access levels of any of the participants 110-1, 110-2, 110-3 are not consistent with any of the songs 130-1 through 130-6, one or more substitute media entities may be identified based on any attributes of the participants 110-1, 110-2, 110-3 or any of the songs 130-1 through 130-6**, and may be included in the media queue accordingly. For example, where one version of a song selected by a participant is limited to subscribers to a specific media source or streaming account, or to those who pay a premium, another version of the same song, or another song that may be similar or related to the version of the song, may be identified as a substitute and included in the media queue.

Information regarding the songs 130-1 through 130-6 being played by the mobile device 112-4 may be provided to the mobile device 112-1 of the participant 110-1, e.g., over the one or more networks 190. For example, as is shown in FIG. 1J, a user interface 125-6 is rendered on the display of the mobile device 112-1. The user interface 125-6 includes one or more identifiers or information regarding the song 130-5 being played, e.g., a title of the song 130-5, as well as a band or an artist of the song 130-5, and a year in which the song 130-5 was first released. Additionally, the user interface 125-6 further includes one or more elements (or features) for playing, pausing, stopping, rewinding or fast-forwarding the song 130-5. The user interface 125-6 also indicates that the song 130-4 will be played next, after the song 130-5 is completed. The user interface 125-6 further invites the participant 110-1 to add additional media entities to the media queue while the playing of one or more of the songs 130-1 through 130-6 in accordance with the media queue is in progress, e.g., by one or more interactions with the user interface 125-6, by one or more voice commands, or in any other manner.

For example, one or more of the participants 110-1, 110-2, 110-2 may add media entities to the media queue, remove media entities from the media queue, or change an order of the media entities in the media queue, e.g., by one or more interactions with any of the user interfaces 125-2, 125-3, 125-4, 125-5, or like user interfaces, or by one or more voice commands. Such additions, removals or changes may be made while one or more of the songs 130-1 through 130-6 or any other songs are being played in accordance with the media queue, while the playing of such songs has been paused or stopped, or at any other time. Moreover, in some implementations, one or more additional participants may be identified and authorized to add media entities to the media queue, remove media entities from the media queue, or change an order of the media entities in the media queue while the playing of one or more of the songs 130-1 through 130-6 in accordance with the media queue is in progress. Furthermore, in some implementations, one or more additional listeners may be invited to listen to media entities in the media queue by their respective devices, or restricted from listening to media entities in the media queue, also while the playing of one or more of the songs 130-1 through 130-6 in accordance with the media queue is in progress.

The device 112-4 shown in FIG. 1J is a smart speaker in communication with at least the control system 150 over the one or more networks 190. Alternatively, or additionally, the device 112-4 may be any other type of component or system that is configured to play media entities, e.g., the songs 130-1 through 130-6. For example, in some implementations, the control system 150 may cause the songs 130-1 through 130-6 to be played by one of the mobile devices 112-1, 112-2, 112-3 of the participants 110-1, 110-2, 110-3, or by any other devices or systems of any of the listeners 180-*n* (not shown). In some implementations, the device 112-4 may be directly associated with the participant 110-1 or the mobile device 112-1, and may be paired or otherwise connected with the mobile device 112-1, or designated by the participant 110-1 to play the songs 130-1 through 130-6 subject to the instructions of the control system 150. Alternatively, or additionally, the device 112-4 may be associated with any of the other participants 110-2, 110-3, or any other individual or entity.

As used herein, the term "media entity" may refer to media content of any type or form (e.g., audio and/or video) that may be recorded, stored, maintained or transmitted in one or more files, such as a song (e.g., a title), a podcast, a movie, a television show, or any other audio and/or video programs. The term "media entity" may also refer to a descriptor of media content, e.g., an era, a genre, or a mood, or any other descriptor of one or more audio and/or video programs. The term "media entity" may further include a file including information, data or metadata regarding one or more sets of media content, or a physical or virtual representation of the one or more sets of media content, such as an album, a playlist, a soundtrack, or any other information, data, metadata, or representations. The term "media entity" may also include one or more persons or entities associated with such media content, e.g., an artist, a group, a label, a producer, a service, a station, or any other persons or entities.

Media content that may be included in a queue or a media queue includes, but need not be limited to, one or more media entities retrieved from a music catalog, repository or streaming service, one or more advertisements of items, goods or services, or one or more news, sports or weather programs, which may be generated live or previously recorded. Media content that may be included in a queue also includes audio data representing words that are spoken or sung by any creators, guests, musicians, celebrities, personalities, athletes, politicians, or artists, or others.

Figure 2A:
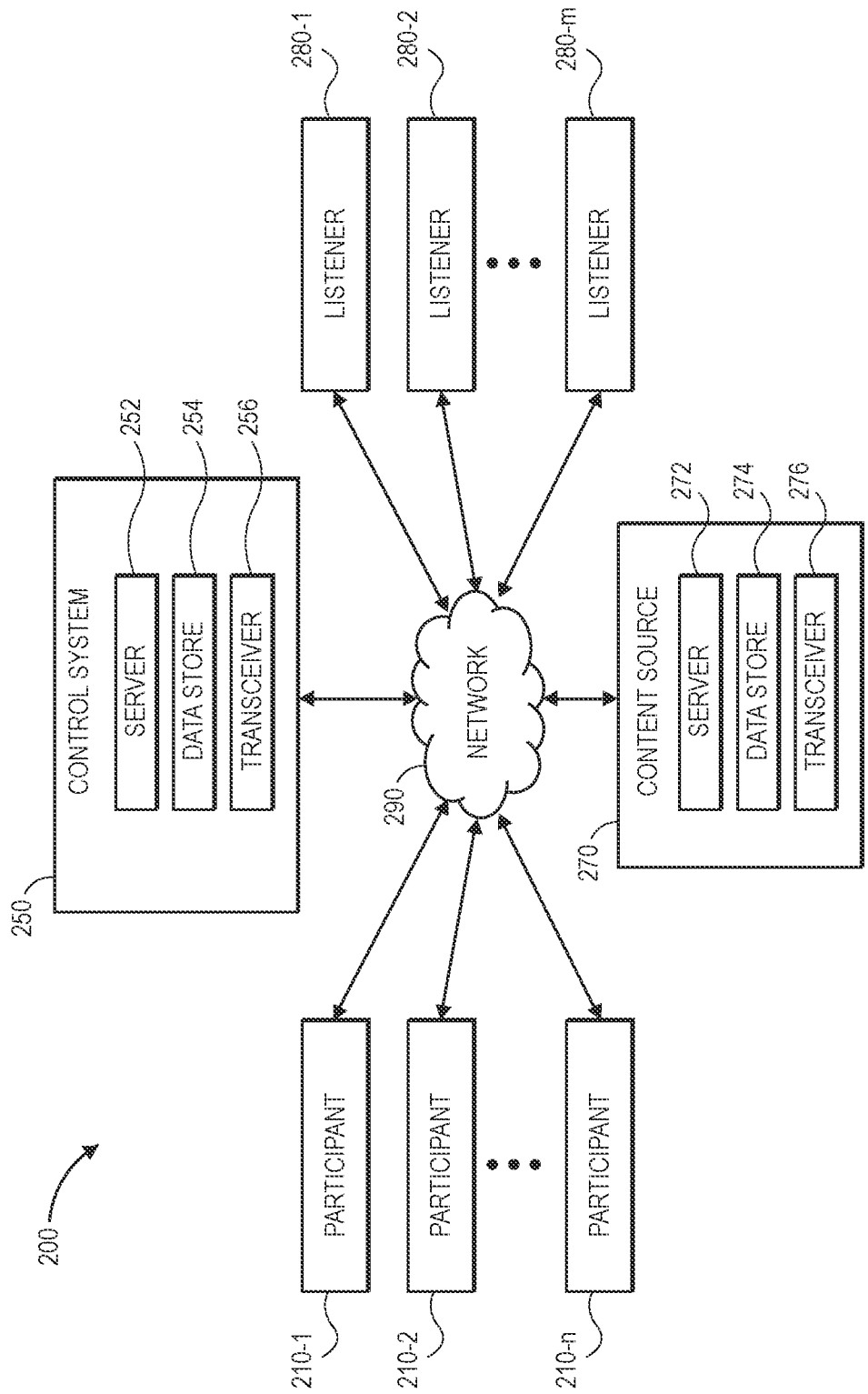
FIGS. 2A and 2B are block diagrams of components of one system for generating media queues in accordance with embodiments of the present disclosure.
Figure 2B:
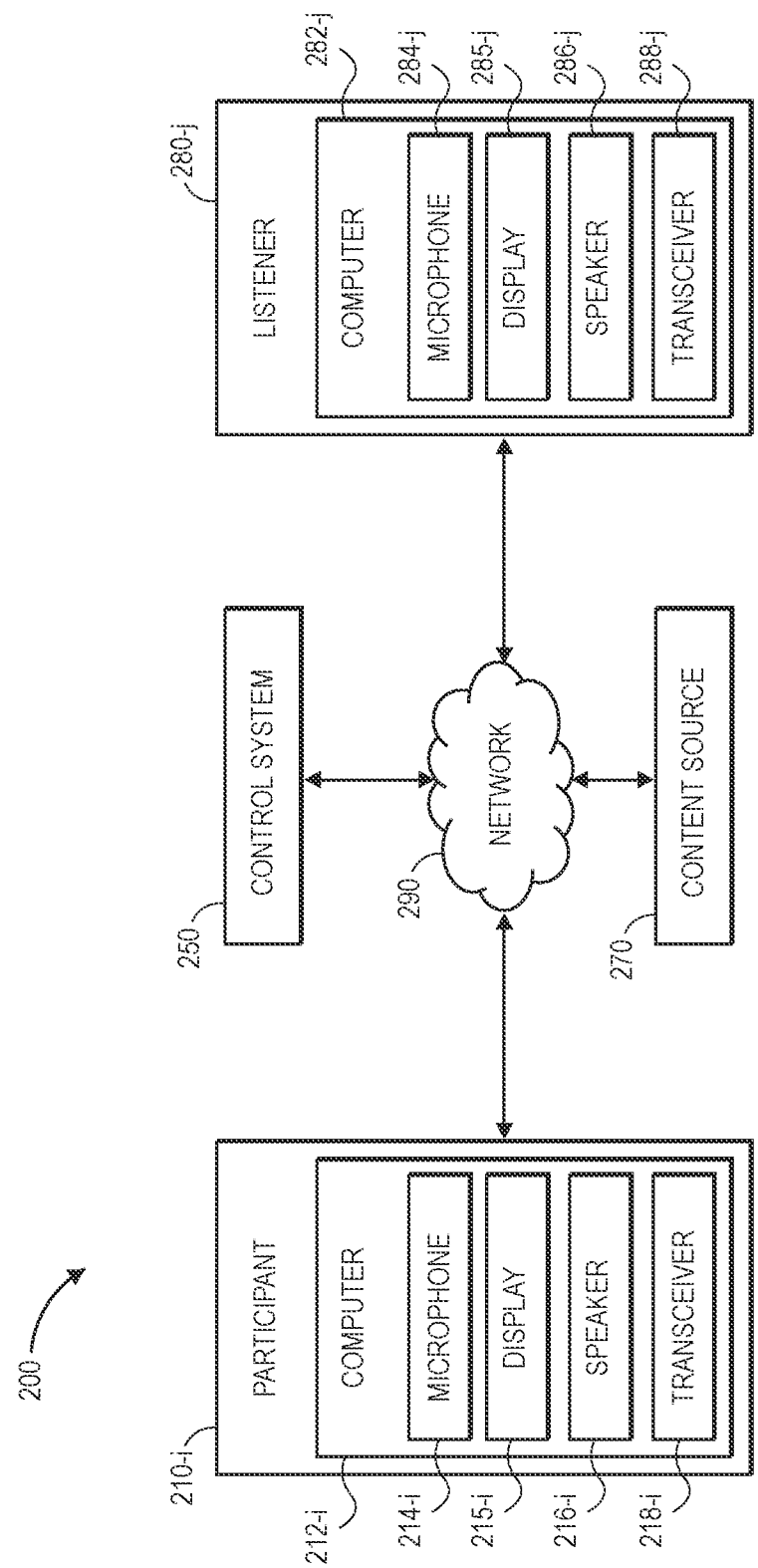

Referring to FIGS. 2A and 2B, block diagrams of components of one system 200 for generating media queues in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1J.

As is shown in FIG. 2A, the system 200 shown in FIG. 2A includes a plurality of participants 210-1, 210-2 . . . 210-*n*, a control system 250, a content source 270 and a plurality of listeners 280-1, 280-2 . . . 280-*m* that are connected to one another over one or more networks 290.

The participants 210-1, 210-2 . . . 210-*n* may be of any number n in accordance with implementations of the present disclosure. Likewise, the listeners 280-1, 280-2 . . . 280-*m* may be of any number m in accordance with implementations of the present disclosure. A representative participant 210-*i* of the participants 210-1, 210-2 . . . 210-*n* and a representative listener 280-*i* of the listeners 280-1, 280-2 . . . 280-*m* are shown in FIG. 2B. As is shown in FIG. 2B, the participant 210-*i* is associated with or operates a computer system 212-*i* having a microphone 214-*i*, a display 215-*i*, a speaker 216-*i* and a transceiver 218-*i*, and any other components. The listener 280-*j* is associated with or operates a computer system 282-*j* having a microphone 284-*j*, a display 285-*j*, a speaker 286-*j* and a transceiver 288-*j*, and any other components.

In some implementations, a participant 210-*i* may be an individual or entity having permission to add or remove a media entity from a media queue, or to vote on or modify an order or sequence of media entities in a media queue. In some implementations, a listener 280-*j* may be an individual or entity that is permitted to listen to media entities in a media queue, or does in fact listen to media entities in a media queue, but does not have permission to add or remove a media entity from a media queue, or to vote on or modify an order or sequence of media entities in a media queue. Thus, in accordance with implementations of the present disclosure, a participant 210-*i* may be a listener 280-*j*, but a listener 280-*j* may not be a participant 210-*i*.

In some implementations, one or both of the computer systems 212-*i*, 282-*j* may be a mobile device, such as a smartphone, a tablet computer, a wristwatch, or others. In some other implementations, one or both of the computer systems 212-*i*, 282-*j* may be a laptop computer or a desktop computer, or any other type or form of computer. In still other implementations, one or both of the computer systems 212-*i*, 282-*j* may be, or may be a part of, a smart speaker, a television, an automobile, a media player, or any other type or form of system having one or more processors, memory or storage components (e.g., databases or other data stores), or other components.

The microphones 214-*i*, 284-*j* may be any sensor or system for capturing acoustic energy, including but not limited to piezoelectric sensors, vibration sensors, or other transducers for detecting acoustic energy, and for converting the acoustic energy into electrical energy or one or more electrical signals. The displays 215-*i*, 285-*j* may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The displays $215\text{-}i$, $285\text{-}j$ may be configured to receive content from any number of sources via one or more wired or wireless connections, e.g., the control system 250, the content source 270 or any other system, over the networks 290.

In some implementations, one or both of the displays $215\text{-}i$, $285\text{-}j$ may be an interactive touchscreen that may not only display information or data but also receive interactions with the information or data by contact with a viewing surface. For example, one or both of the displays $215\text{-}i$, $285\text{-}j$ may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speakers $216\text{-}i$, $286\text{-}j$ may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver $218\text{-}i$, $288\text{-}j$ may be configured to enable the computer system $212\text{-}i$, $282\text{-}j$ to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver $218\text{-}i$, $288\text{-}j$ may further include or be in communication with one or more input/output (or "I/O") interfaces, network interfaces and/or input/output devices, and may be configured to allow information or data to be exchanged between one or more of the components of the computer system $212\text{-}i$, $282\text{-}j$ or to one or more other computer devices or systems (e.g., other aerial vehicles, not shown) via the network 290. The transceiver $218\text{-}i$, $288\text{-}j$ may perform any necessary protocol, timing or other data transformations in order to convert data signals from a first format suitable for use by one component into a second format suitable for use by another component. In some embodiments, the transceiver $218\text{-}i$, $288\text{-}j$ may include support for devices attached through various types of peripheral buses, e.g., variants of the Peripheral Component Interconnect (PCI) bus standard or the Universal Serial Bus (USB) standard. In some other embodiments, functions of the transceiver $218\text{-}i$, $288\text{-}j$ may be split into two or more separate components.

In some implementations, the computer system $212\text{-}i$, $282\text{-}j$ may include a common frame or housing that accommodates the microphone $214\text{-}i$, $284\text{-}j$, the display $215\text{-}i$, $285\text{-}j$, the speaker $216\text{-}i$, $286\text{-}j$ and/or the transceiver $218\text{-}i$, $288\text{-}j$. In some implementations, applications or functions or features described as being associated with the computer system $212\text{-}i$, $282\text{-}j$ may be performed by a single system. In some other implementations, however, such applications, functions or features may be split among multiple systems. For example, an auxiliary system, such as speakers, ear buds, headphones, or others, may perform one or more of such applications or functions, or include one or more features, of the computer system $212\text{-}i$, $282\text{-}j$ or other computer systems or devices described herein, and may exchange any information or data that may be associated with such applications, functions or features with the computer system $212\text{-}i$, $282\text{-}j$, as necessary. Alternatively, or additionally, the computer system $212\text{-}i$, $282\text{-}j$ may include one or more power supplies, sensors (e.g., visual cameras or depth cameras), feedback devices (e.g., haptic feedback systems), chips, electrodes, clocks, boards, timers or other relevant features (not shown).

In some implementations, the computer system $212\text{-}i$, $282\text{-}j$ may be programmed or configured to render one or more user interfaces on the display $215\text{-}i$, $285\text{-}j$ or in any other manner, e.g., by a browser or another application. The computer system $212\text{-}i$, $282\text{-}j$ may receive one or more gestures or other interactions with such user interfaces, and such gestures or other interactions may be interpreted to generate one or more instructions or commands that may be provided to one or more of the control system 250 or the content source 270. Alternatively, or additionally, the computer system $212\text{-}i$, $282\text{-}j$ may be configured to present one or more messages or information to the participant $210\text{-}i$ in any other manner, e.g., by voice, and to receive one or more instructions or commands from the participant $210\text{-}i$ or the listener $280\text{-}j$, e.g., by voice.

In accordance with the present disclosure, a participant $210\text{-}i$ or a listener $280\text{-}j$ that requests to receive music or another media entity from a service may also be referred to as a "subscriber" to a source of media content, e.g., a streaming service, or another source. Those of ordinary skill in the pertinent arts will recognize that the computer devices $212\text{-}i$, $282\text{-}j$ may include any number of hardware components or operate any number of software applications for playing media content received from the control system 250 and/or the media sources 270, or from any other systems or devices (not shown) connected to the network 290. Moreover, those of ordinary skill in the pertinent arts will further recognize that, alternatively, in some implementations, the computer device $212\text{-}i$, $282\text{-}j$ need not be associated with a specific participant $210\text{-}i$ or listener $280\text{-}j$. For example, the computer device $212\text{-}i$, $282\text{-}j$ may be provided in a public place, under the control of multiple participants $210\text{-}i$ or listeners $280\text{-}j$, or beyond the control of any participants $210\text{-}i$ or listeners $280\text{-}j$, e.g., in a bar, a restaurant, a transit station, a shopping center, or elsewhere, where any individuals may listen to music or other media entities.

As is shown in FIGS. 2A and 2B, the control system 250 may be any single system, or two or more of such systems, that is configured to establish or terminate channels or connections with or between the participants 210-1, 210-2 . . . 210-$n$, the listeners 280-1, 280-2 . . . 280-$m$, or the content source 270, to initiate a playing of media content, or to control the receipt and transmission of media content from the content source 270 to the participants 210-1, 210-2 . . . 210-$n$ or the listeners 280-1, 280-2 . . . 280-$m$. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the participant 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fees. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the participant 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, a 3G network, a 4G network, a 5G network, or some other type of wireless network. Protocols and components for communicating via the Internet or any of the other aforementioned types of communication networks are well known to those skilled in the art of computer communications and thus, need not be described in more detail herein.

Although the system 200 shown in FIGS. 2A and 2B show boxes for three participants 210-1, 210-2 . . . 210-$n$, one control system 250, one media source 270, three listeners 280-1, 280-2 . . . 280-$m$ and one network 290, those of ordinary skill in the pertinent arts will recognize that any number of participants 210-$n$, broadcast systems 250, media sources 270, listeners 280-$m$ or networks 290 may be utilized to transmit, receive, access, hear, or view media content provided in accordance with implementations of the present disclosure. Moreover, the computer devices 212-$i$, 252, 272, 282-$j$ may include all or fewer of the components shown in FIG. 2A or 2B or perform all or fewer of the tasks or functions described herein. Tasks or functions described as being executed or performed by a single system or device associated with the participant 210-$n$, the control system 250, the media source 270 or the listeners 280-$m$ may be executed or performed by multiple systems or devices associated with each of the participants 210-1, 210-2 . . . 210-$n$, the control system 250, the media source 270 or the listeners 280-1, 280-2 . . . 280-$m$. For example, the tasks or functions described herein as being executed or performed by the control system 250 may be performed by a single system, or by separate systems for establishing two-way connections with the participants 210-1, 210-2 . . . 210-$n$ or any number of media sources 270, the listeners 280-1, 280-2 ... 280-*m* or any other systems, or for establishing one-way connections with any number of media sources 270 and transmitting data representing media content, e.g., a broadcast system, from such media sources 270 to such participants 210-1, 210-2 ... 210-*n* or such listeners 280-1, 280-2 ... 280-*m*. Moreover, two or more participants 210 may collaborate on the construction of a media queue.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212-*i*, 282-*j* or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212-*i*, 282-*j* or the servers 252, 272 may be configured to transmit information or data in the form of synchronous or asynchronous messages to one another in real time or in near-real time, or in one or more offline processes, via the networks 290. Those of ordinary skill in the pertinent art would recognize that the participants 210-1, 210-2 ... 210-*n*, the control system 250, the media source 270 or the listeners 280-1, 280-2 ... 280-*m* may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212-*i*, 282-*j* or the servers 252, 272, or to any other computers or control systems utilized by the participants 210-1, 210-2 ... 210-*n*, the control system 250, the media source 270, or the listeners 280-1, 280-2 ... 280-*m* and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Referring to FIG. 3, a flow chart 300 of one process for generating media queues in accordance with embodiments of the present disclosure is shown.

At box 310, participants are invited to construct a media queue of media entities. In some implementations, one of the participants may initiate a sending of invitations to designated individuals by one or more interactions with a user interface, by one or more voice commands to a voice-enabled system, or in any other manner. Following the designation or selection of participants, one or more electronic messages may be transmitted to devices or accounts that are associated with each of such participants, and each of such messages may include a link or another feature enabling a participant to accept or decline an invitation to generate a media queue or to participate in an event or occasion (e.g., a party) at which media entities will be played in accordance with the media queue. Alternatively, the invitations may be sent to a group of participants automatically, e.g., by a control system, or another system, on a predetermined time or in accordance with a predetermined schedule, and such participants may be selected randomly or on any other basis.

In some implementations, the event or occasion at which media entities of the media queue are to be played may be limited to one or more of the participants invited at box 310. Alternatively, in some other implementations, the event or occasion may be further attended by any number of other individuals, e.g., listeners, who will also be present at the event occasion at which the media entities of the media queue are to be played. The number of participants in the construction of the media queue, or the participants or listeners who are present as the media entities of the media queue are played, is not limited by any of the implementations disclosed herein. Furthermore, in some implementations, none of the participants who are involved in the generation of a media queue need be involved in the event or occasion, or actually listen to the media entities of the media queue. For example, in some implementations, the participants may be or include one or more parents involved in planning a party for children. The participants may select, review and approve media entities for inclusion in a media queue, and the media entities may be played at the party in accordance with the media queue, even if some or all of the participants who generated the media queue are not in attendance.

At box 315, access levels of the participants and any listeners are determined based on their identities. For example, the access levels may relate to access to a specific service or application, e.g., a streaming service, or a data store, e.g., on a specific device or system, from which media entities may be obtained. In some implementations, each of the participants and any listeners may have an equal or equivalent level of access to media entities. In some other implementations, however, one or more participants or listeners may have a higher or greater level of access, or a lower or lesser level of access, than one or more other participants or listeners.

At box 320, a record of media entities in the media queue is generated. Where a media queue is initially generated, the record constitutes a null set. Alternatively, in some implementations, upon an initial generation of the media queue, the record may include a media entity that is typically included, or is required to be included, in media queues involving one or more of the participants or listeners. The record of the media entities may be stored in association with one or more of the participants in a data store of a server or other system associated with a streaming service, a device associated with one or more of the participants, or any other system.

At box 325, whether a selection of a media entity is received from any participants is determined. For example, where a participant is invited to select media entities for inclusion in a media queue, the participant may execute one or more interactions with a user interface rendered on his or her mobile device, or provide one or more voice commands to a voice-enabled system, and may specify a media entity by a name or title, an artist, an album name, a genre, or any other identifier. A media entity may be selected by a participant in any manner.

If no selections are received from any of the participants, then the process advances to box 330, where whether it is time to begin playing media entities in the media queue is determined. If it is not time to begin playing media entities in the media queue, then the process returns to box 325, where whether a selection of a media entity has been received from any of the participants is determined. For example, a control system or any other device or system, or application operating thereon, may monitor for selections of media entities between a time at which the participants were invited to construct the media queue at box 310 until the time at which the playing of media entities in the media queue is scheduled to begin.

If a selection of a media entity is received from a participant, then the process advances to box 335, where the selection of the media entity is compared to the access levels of the participants. For example, where a selection of a media entity identifies the media entity by one or more of an album, an artist, an era, a genre, a group, a label, a mood, a playlist, a producer, a service, a station, a title, or in any other manner, whether the participants or listeners, or devices of such participants or listeners, have access to receive and hear the media entity are determined. In some implementations, the media entity may be of limited availability, such that only participants or listeners, or devices of such participants or listeners, having actual access to or possession of one or more files or records including the media entity, or access to a service (e.g., a media streaming service) from which the media entity may be obtained, may access the media entity. In such implementations, whether each of the participants or listeners has access to receive and hear the media entity may be determined.

At box 340, whether the media entity selected at box 325 is consistent with access levels of all of the participants or listeners is determined. If the media entity selected at box 325 is consistent with access levels of all of the participants or listeners, then the process advances to box 345, where the record of the media queue is updated to include the selected media entity, before returning to box 330, where whether it is time to being playing media entities in the media queue is determined.

If the media entity selected at box 325 is not consistent with access levels of all of the participants or listeners, then the process advances to box 350, where the participant that selected the media entity at box 325 is prompted to select an alternate media entity. For example, the participant that selected the media entity may be prompted to select an alternate media entity by one or more user interfaces, windows or other interfaces, which may identify the media entity or media entities that are not consistent with access levels of any participants or listeners, and include a prompt for the participant to identify an alternate media entity.

At box 355, whether the participant that selected the media entity at box 325 has selected an alternate media entity is determined. If the participant selects an alternate media entity, then the process returns to box 340, where whether the selected media entity is consistent with permissions of all of the participants and listeners is determined. If the participant does not select an alternate media entity, then the process advances to box 360, where the record of the media queue is not updated to include the selected media entity, before returning to box 330, where whether it is time to being playing media entities in the media queue is determined. Alternatively, in some implementations, a substitute media entity may be automatically identified for the one or more participants or listeners for whom the media entity selected at box 325 is inconsistent with their respective permissions. The substitute media entity may be automatically selected on any basis, such as a level of similarity or consistency with the media entity selected at box 325, subject to permissions of each of the participants and listeners.

For example, in some implementations, where one of the participants has selected a live version of a media entity that is only available with a premium subscription to a media streaming service, but a studio version of the same media entity is available without the premium subscription, the studio version of the media entity may be automatically selected for inclusion in the media queue, in lieu of the live version. Where one of the participants has selected a version of a media entity by one artist or band that is only available with the payment of a fee, but a version of the same media entity by another artist or band is available without payment of a fee, the version of the media entity by the other artist or band may be automatically selected for inclusion in the media queue. Where one of the participants has selected a media entity that may be played on one device, but media entities in the media queue are to be played on another device, another media entity that is authorized to be played on the other device may be selected.

If it is time to begin playing media entities in the media queue at box 330, then the process advances to box 365, where a record of the media queue is stored in one or more data stores. The process then advances to box 370, where media entities are transmitted to one or more selected devices in accordance with the media queue, and the process ends. The selected devices may be a single device within an acoustic range of all of the participants or listeners, or multiple devices, each of which may be associated with one of the participants or listeners.

As is discussed above, in some implementations, the media queue may be modified by adding media entities to the media queue, removing media entities from the media queue, or changing an order of the media entities in the media queue, while media entities are being transmitted to one or more selected devices at box 370. For example, a participant may execute one or more interactions with a user interface or utter one or more voice commands that may identify or reference a media entity, or instruct the addition or the removal of the media entity from a media queue while media entities are being transmitted to one or more selected devices at box 370. Alternatively, or additionally, a participant may execute one or more interactions with a user interface or utter one or more voice commands that cause an order of the media entities in the media queue to be modified, while media entities are being transmitted to one or more selected devices at box 370. Furthermore, additional participants may be invited to modify the media queue, by adding media entities, removing media entities, or changing an order of media entities, as well.

Where a media queue is generated for a group of participants or listeners, a modified version of the media queue may be generated for one or more of the participants or listeners, where a media entity in the media queue is identified as unsuitable for one or more of the participants or listeners for any reason. For example, where a media queue has been generated for a group of participants and listeners and includes a media entity (e.g., a song) that is known or believed to be disfavored by one of the participants or listeners, a substitute media entity may be selected, and an alternate media queue including the substitute media entity, but not the media entity for which the substitute media entity was selected, may be generated for that participant or listener.

Referring to FIGS. 4A through 4G, views of aspects of one system for generating media queues in accordance with embodiments of the present disclosure are shown. Except where otherwise noted, reference numerals preceded by the number "4" shown in FIGS. 4A through 4G indicate components or features that are similar to components or features having reference numerals preceded by the number "2" shown in FIG. 2A or FIG. 2B or by the number "1" shown in FIGS. 1A through 1J.

Figure 4A:
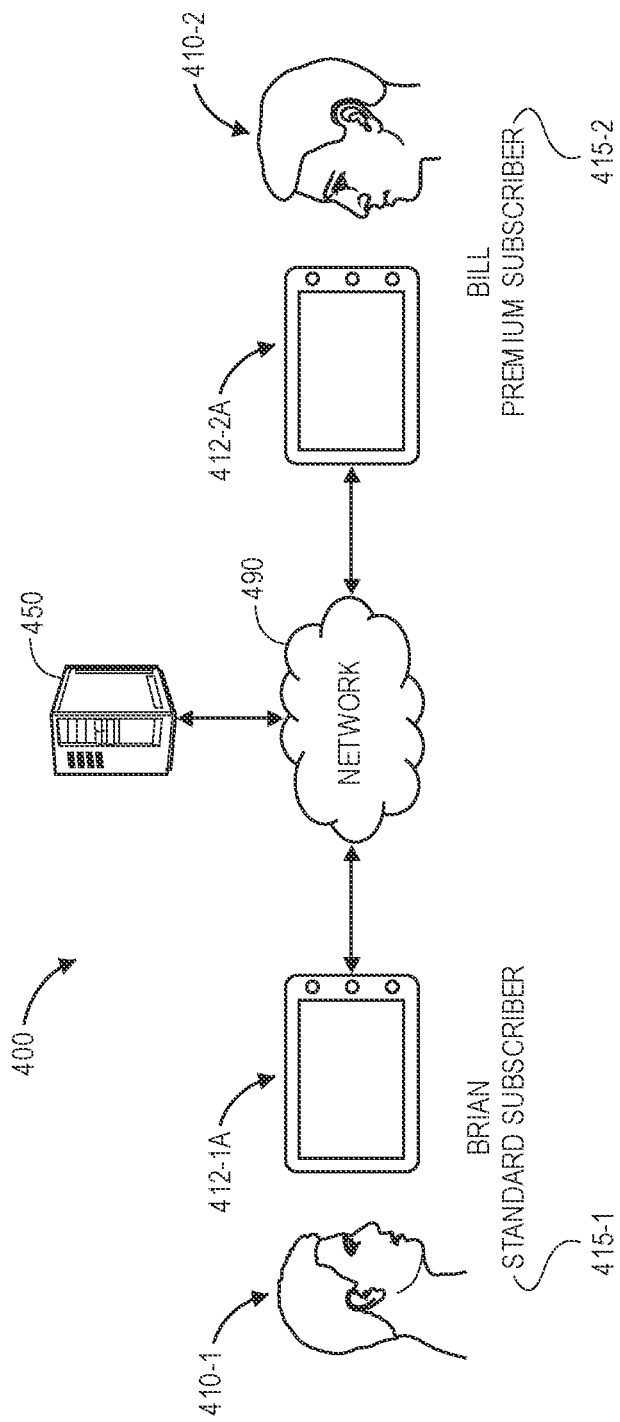
FIGS. 4A through 4G are views of aspects of one system for generating media queues in accordance with embodiments of the present disclosure.

As is shown in FIG. 4A, a system 400 includes a mobile device 412-1A of a participant 410-1 in a generation of a media queue, a mobile device 412-2A of another participant 410-2 in the generation of the media queue, and a control system 450 that are connected to one another over one or more networks 490, which may include the Internet in whole or in part. Alternatively, or additionally, the system 400 may further include any devices or systems associated with sources of content, or any devices or systems of listeners who are not participants in the generation of a media queue.

The participant 410-1 has a standard subscription 415-1 to a media streaming service, and the participant 410-2 has a premium subscription 415-2 to the media streaming service. For example, in some implementations, the standard subscription 415-1 may entitle the participant 410-1 to access a smaller number of media entities, or to access media entities of a lower level of quality (e.g., as defined with respect to file sizes, durations, numbers of channels, intensities, sampling rates, bit depths or other attributes of the media entities), free of charge or at a fee that is less than a fee associated with the premium subscription 415-2. Conversely, the premium subscription 415-2 may entitle the participant 410-2 to access a larger number of media entities, or to access media entities of a higher level of quality, at a fee that is greater than the fee associated with the standard subscription 415-1. Alternatively, or additionally, the participant 410-1 may have access to a first set of media entities, or a first media streaming service, and the participant 410-2 may have access to a second set of media entities that may be different from the first set of media entities, or a second media streaming service that may be different from the first media streaming service.

Figure 4B:
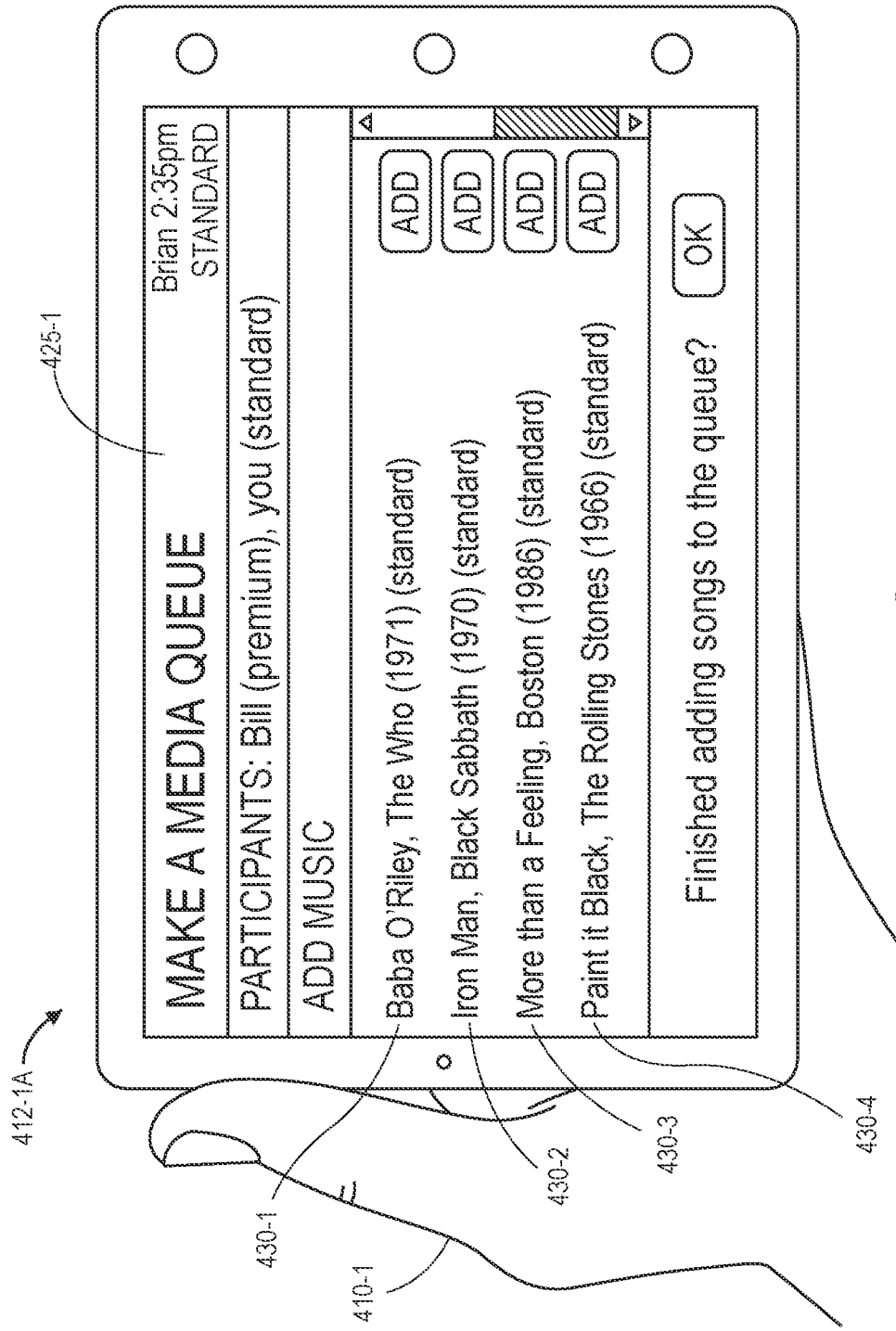

As is shown in FIG. 4B, the participant 410-1 operates the mobile device 412-1A to select one or more media entities for inclusion in a media queue. For example, a user interface 425-1 rendered by the mobile device 412-1A may include information identifying the participant 410-1 and his or her subscription or level of access, as well as other participants, viz., the participant 410-2, and their respective subscriptions or levels of access. The user interface 425-1 also identifies a plurality of songs 430-1, 430-2, 430-3, 430-4, including the song 430-1 "Baba O'Riley" by the band The Who, the song 430-2 "Iron Man" by the band Black Sabbath, the song 430-3 "More Than a Feeling" by the band Boston, and the song 430-4 "Paint It Black" by the band The Rolling Stones. The user interface 425-1 further indicates that each of the songs 430-1, 430-2, 430-3, 430-4 may be made available to anyone with at least the standard subscription 415-1.

The user interface 425-1 also includes a number of interactive features, e.g., buttons, enabling the participant 410-1 to select one or more of the songs 430-1, 430-2, 430-3, 430-4 for inclusion in the media queue. The user interface 425-1 further includes an interactive feature, e.g., a button, by which the participant 410-1 may confirm his or her selections of songs.

In some implementations, the user interface 425-1 may include a menu listing all of the media entities to which the participant 410-1 has access with the standard subscription 415-1. Alternatively, or additionally, the user interface 425-1 may include a menu listing media entities that are recommended to the participant 410-1. For example, in some implementations, the menu may include media entities that the participant 410-1 has listened to recently or frequently, media entities that are known or believed to be of interest to the participant 410-1 or any other listeners, or media entities that are known or believed to be associated with or relevant to an event or occasion for which the media queue has been generated and the media entities of the media queue are intended to be played.

Figure 4C:
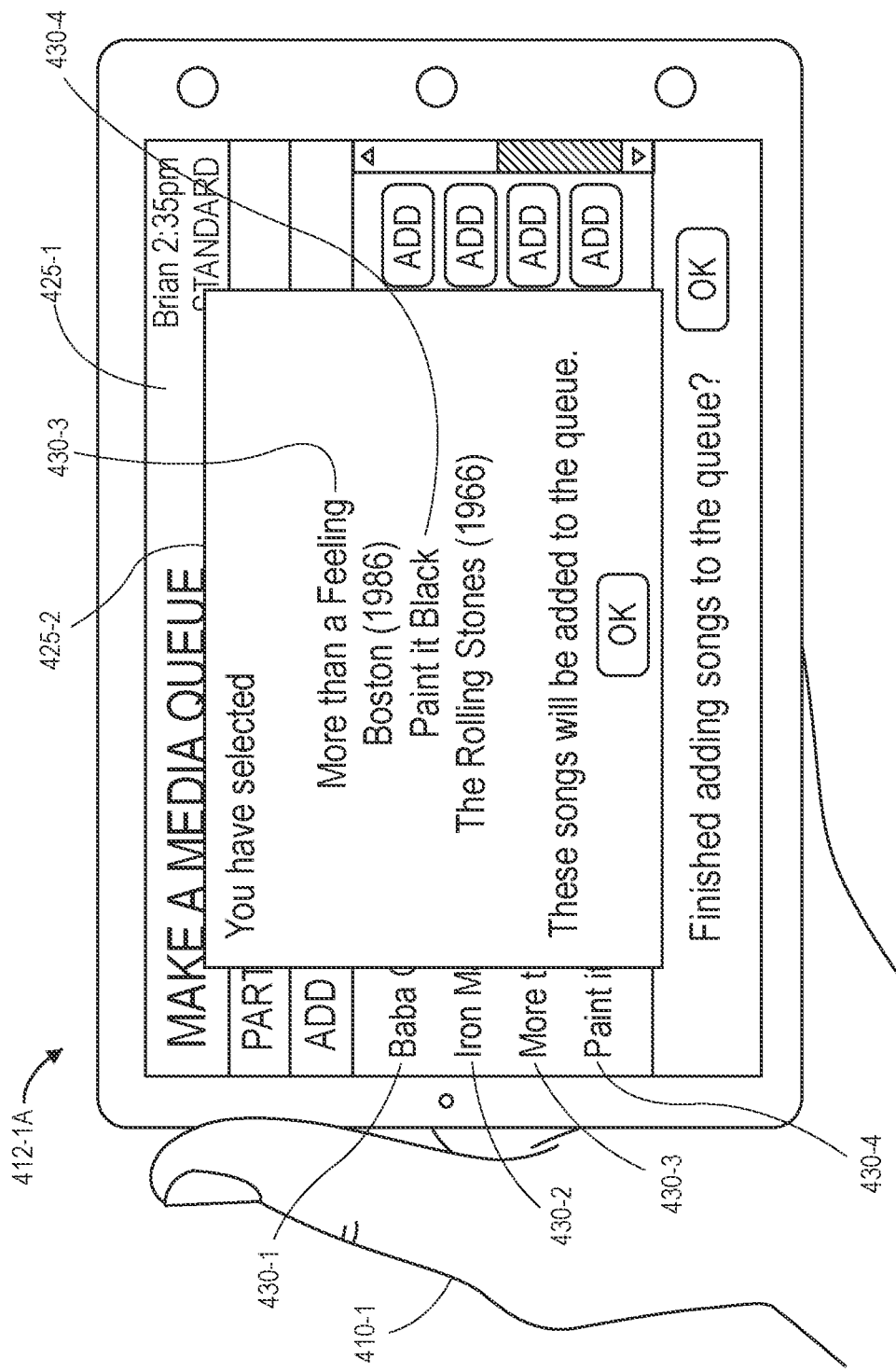

As is shown in FIG. 4C, after the participant 410-1 has selected the songs 430-3, 430-4 and confirmed his or her selections, a window 425-2 or another user interface is displayed on the mobile device 412-1A, e.g., as an overlay on the user interface 425-1. The window 425-2 identifies the songs 430-3, 430-4 and states that the songs 430-3, 430-4 will be added to the media queue. In some implementations, the control system 450 may confirm that each of the songs 430-3, 430-4 is suitable for each of the participants, viz., the participants 410-1, 410-2. For example, the control system 450 may confirm that each of the participants 410-1, 410-2 has a level of access that is sufficient to hear the songs 430-3, 430-4, e.g., at least the standard subscription 415-1. Alternatively, or additionally, the control system 450 may determine whether each of the songs 430-3, 430-4 is a media entity that each of the participants 410-1, 410-2 is known or believed to prefer or favor, or whether any of the songs 430-3, 430-4 is a media entity that either of the participants 410-1, 410-2 is known or believed to not prefer or disfavor.

Figure 4D:
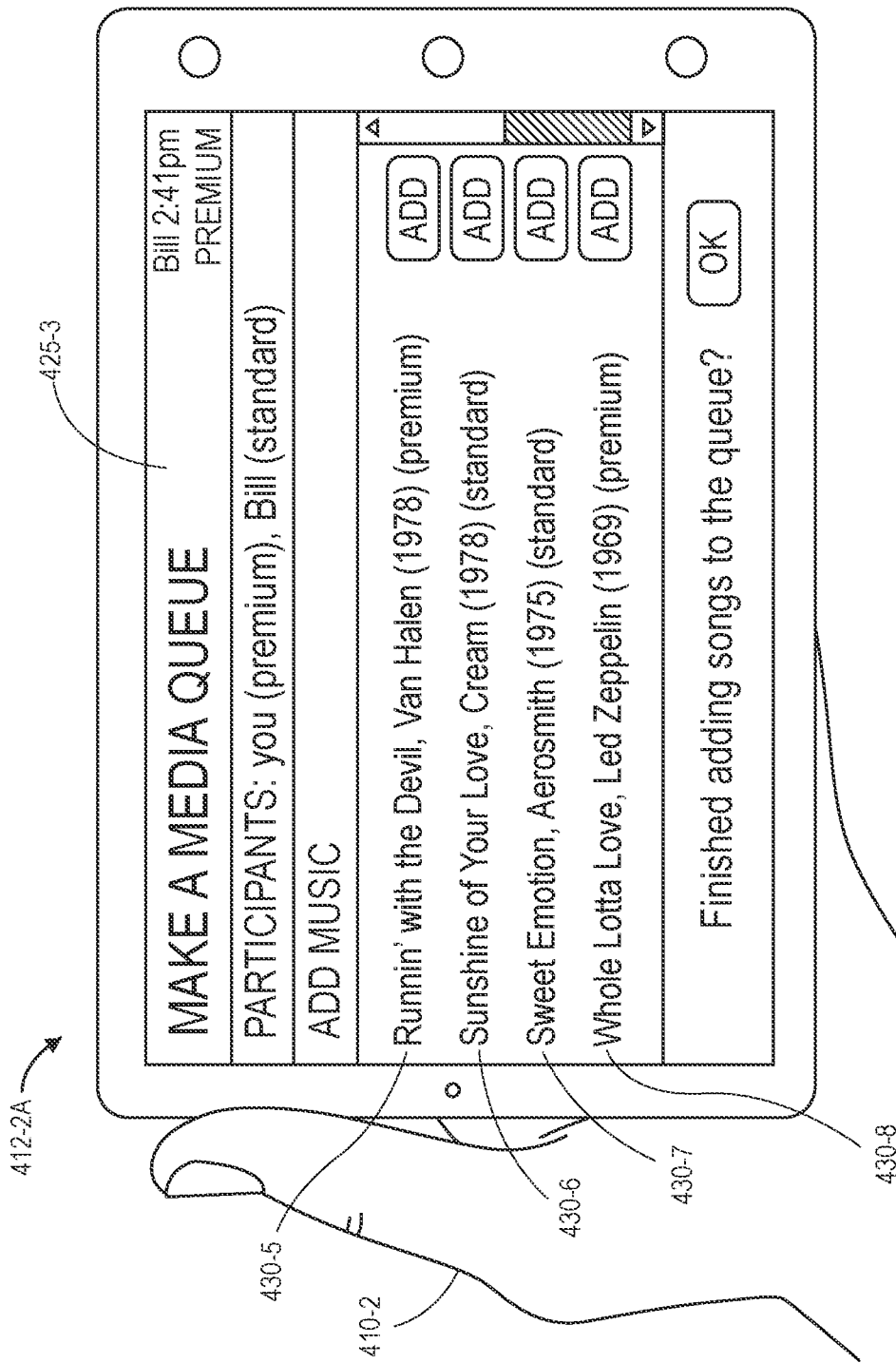

Similarly, as is shown in FIG. 4D, the participant 410-2 operates the mobile device 412-2A to select one or more media entities for inclusion in the media queue. For example, a user interface 425-3 rendered by the mobile device 412-2A may include information identifying the participant 410-2 and his or her subscription or level of access, as well as other participants, viz., the participant 410-1, and their respective subscriptions or levels of access. The user interface 425-3 also identifies a plurality of songs 430-5, 430-6, 430-7, 430-8, including the song 430-5 "Runnin' with the Devil" by the band Van Halen, the song 430-6 "Sunshine of Your Love" by the band Cream, the song 430-7 "Sweet Emotion" by the band Aerosmith, and the song 430-8 "Whole Lotta Love" by the band Led Zeppelin. The user interface 425-3 further indicates that each of the songs 430-6, 430-7 may be made available to anyone with at least the standard subscription 415-1, while the songs 430-5, 430-8 are only available to those with the premium subscription 415-2.

Like the user interface 425-1, the user interface 425-3 also includes a number of interactive features, e.g., buttons, enabling the participant 410-2 to select one or more of the songs 430-5, 430-6, 430-7, 430-8 for inclusion in the media queue. The user interface 425-3 further includes an interactive feature, e.g., a button, by which the participant 410-2 may confirm his or her selections of songs.

Figure 4E:
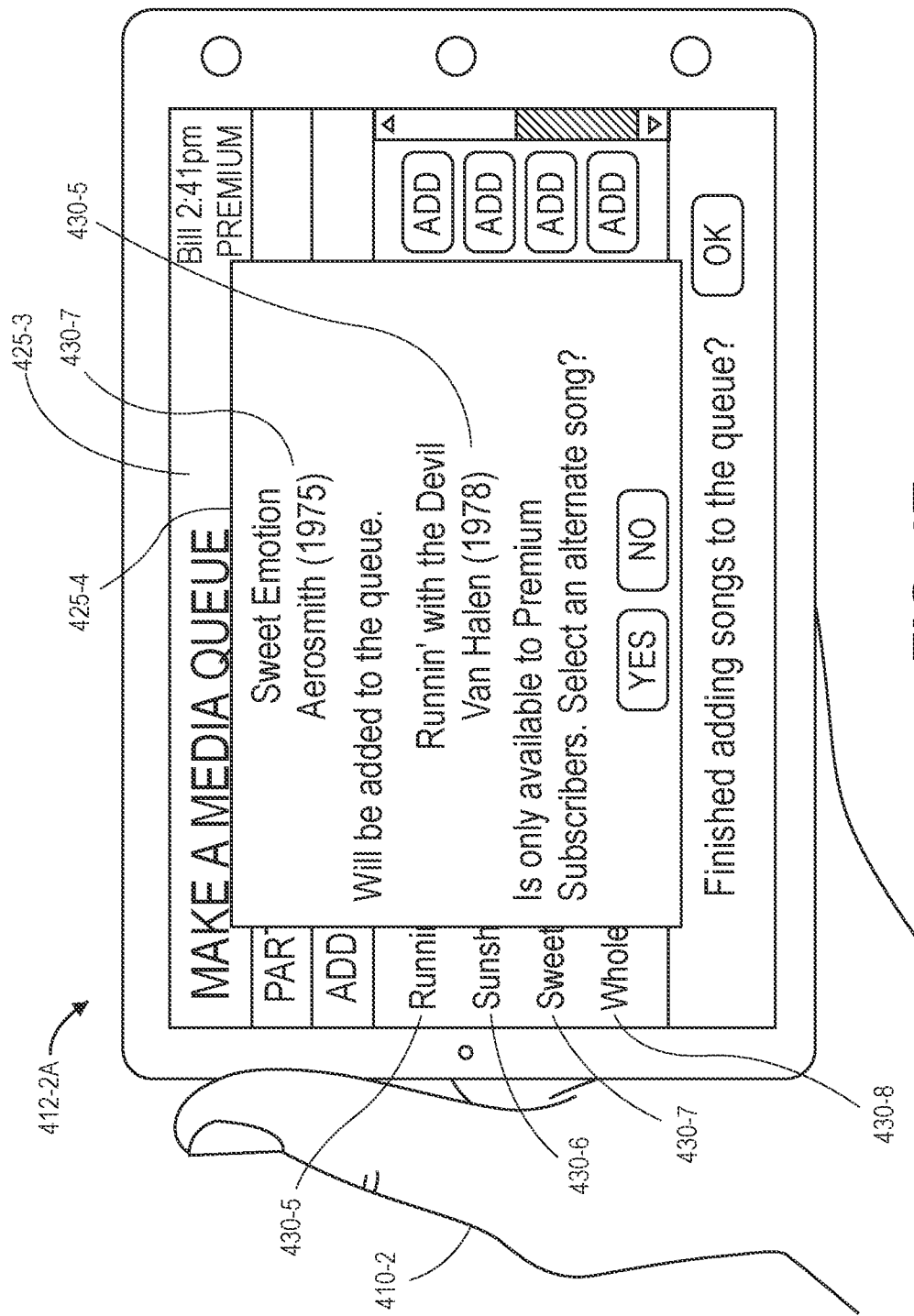

As is shown in FIG. 4E, after the participant 410-2 has selected the songs 430-5, 430-7 and confirmed his or her selections, in some implementations, the control system 450 may determine whether each of the songs 430-5, 430-7 is suitable for each of the participants, viz., the participants 410-1, 410-2. For example, the control system 450 may determine whether each of the participants 410-1, 410-2 has permissions that are sufficient to hear the songs 430-5, 430-7. Alternatively, or additionally, the control system 450 may determine whether each of the songs 430-5, 430-7 is a media entity that each of the participants 410-1, 410-2 is known or believed to prefer or favor, or whether any of the songs 430-5, 430-7 is a media entity that either of the participants 410-1, 410-2 is known or believed to not prefer or disfavor.

As is further shown in FIG. 4E, a window 425-4 or another user interface is displayed on the mobile device 412-2A, e.g., as an overlay on the user interface 425-3. The window 425-4 identifies the songs 430-5, 430-7 and states that the song 430-7, which is available to anyone with at least the standard subscription 415-1, will be added to the media queue. The window 425-4 further indicates that the song 430-5 is available only to those with the premium subscription 415-2, which does not include the participant 410-1. The window 425-4 invites the participant 410-2 to select an alternate song for the song 430-5, or to decline to do so, by one or more interactions with buttons or other features provided on the window 425-4. If the participant 410-2 chooses to select another media entity, the control system 450 may also determine whether that media entity is suitable for each of the participants, e.g., by determining whether each of the participants 410-1, 410-2 has permissions that are sufficient to hear the songs 430-5, 430-7, or whether each of the participants 410-1, 410-2 prefers or favors both of the songs 430-5, 430-7, or whether one or both of the participants 410-1, 410-2 does not prefer or disfavors either of the songs 430-5, 430-7.

Figure 4F:
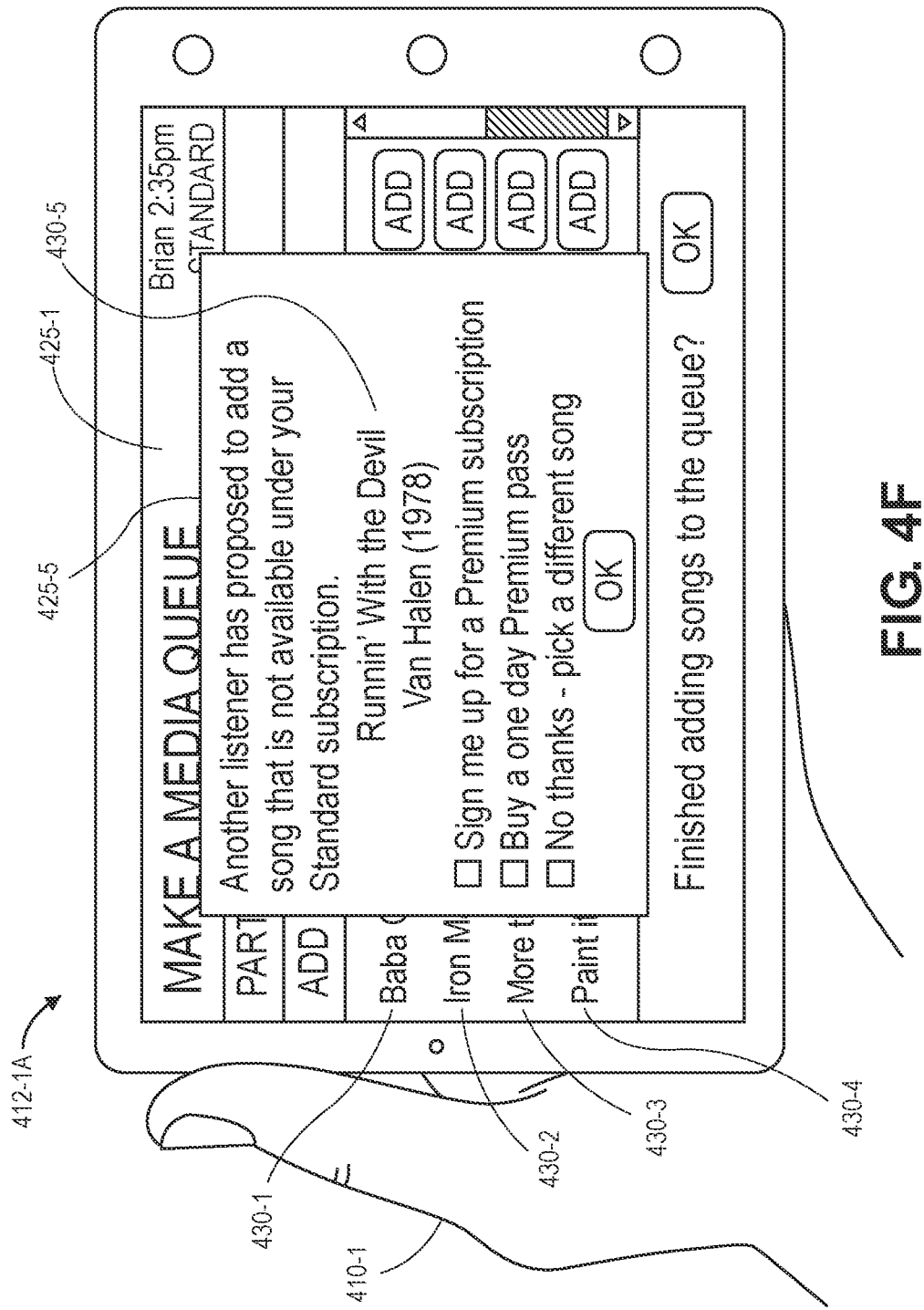

If the participant 410-2 does not choose to select another media entity, or if another media entity selected by the participant 410-2 is also unsuitable to the participant 410-1, then the participant 410-1 may be prompted or invited to upgrade his or her permissions, e.g., by purchasing a premium subscription 415-2, on either a short-term or a long-term basis. As is shown in FIG. 4F, a window 425-5 or another user interface is displayed on the mobile device 412-1A, e.g., as an overlay on the user interface 425-1. The window 425-5 indicates that another participant in the media queue (viz., the participant 410-2) has selected the song 430-5, and states that the song 430-5 is not available under the standard subscription 415-1 held by the participant 410-1. The window 425-5 further invites the participant 410-1 to purchase the premium subscription 415-1, either on a long-term basis or for only a single day, or to decline to purchase the premium subscription 415-1.

Alternatively, or additionally, where identities of one or more intended listeners to the media queue or their devices are known, the control system 450 may also determine whether each of such listeners has access to each of the songs 430-3, 430-4, 430-5, 430-7. The control system 450 may also determine whether each of the songs 430-3, 430-4, 430-5, 430-7 selected by the participants 410-1, 410-2 is a media entity that each of such listeners is known or believed to prefer or favor, or whether any of the songs 430-3, 430-4, 430-5, 430-7 is a media entity that any of the songs is known or believed to not prefer or disfavor.

Figure 4G:
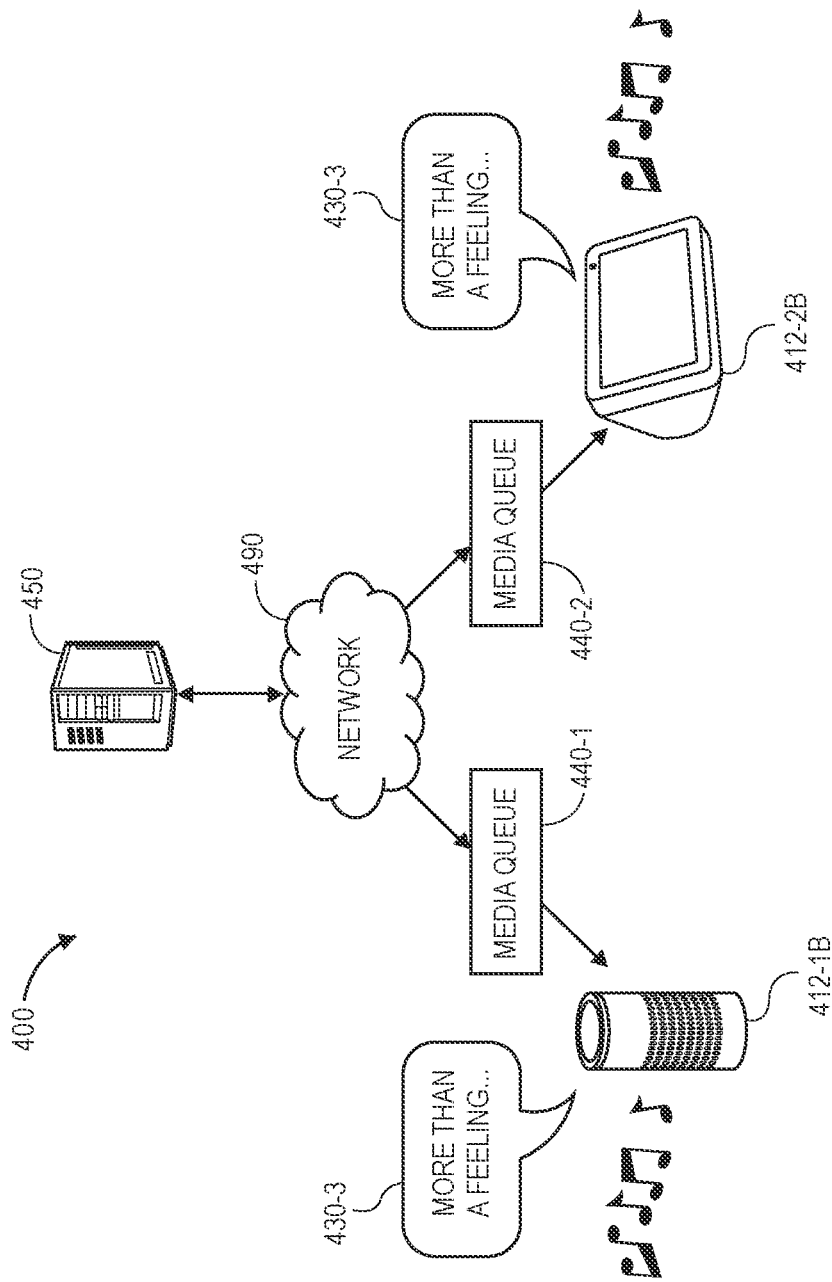

As is shown in FIG. 4G, a media queue 440-1 of songs is transmitted to a device 412-1B associated with the participant 410-1, and a media queue 440-2 of songs is transmitted to a device 412-2B associated with the participant 410-2. Because the participant 410-2 has the premium subscription 415-2, the media queue 440-2 may include each of the songs 430-3, 430-4, 430-5, 430-7, in an order selected by the control system 450 or the participants 410-1, 410-2, or in any other manner. If the participant 410-1 elected to purchase the premium subscription 415-2, on either a short-term or a long-term basis, then the media queue 440-1 may also include each of the songs 430-3, 430-4, 430-5, 430-7, and be transmitted to the device 412-1B in the same order and at the same time as the media queue 440-2 is transmitted to the 412-2B. If the participant 410-1 declined to purchase the premium subscription 415-2, on either a short-term or a long-term basis, then the media queue 440-1 may include the songs 430-3, 430-4, 430-7, and an alternate song designated by the participant 410-2, or a substitute song selected by the control system 450, in lieu of the song 430-5 may be transmitted. The order or the timing at which each of the songs is transmitted to the respective devices may be modified, as necessary, to ensure that the media queues 440-1, 440-2 are played in a synchronized manner with respect to the songs that are included in each of the media queues 440-1, 440-2.

Moreover, in some implementations, one or more of the participants 410-1, 410-2 may further continue to add media entities to either of the media queues 440-1, 440-2, remove media entities from either of the media queues 440-1, 440-2, or change an order of media entities in either of the media queues 440-1, 440-2, as the media entities are being played by the devices 412-1B, 412-2B, or at any other time.

Figure 5:
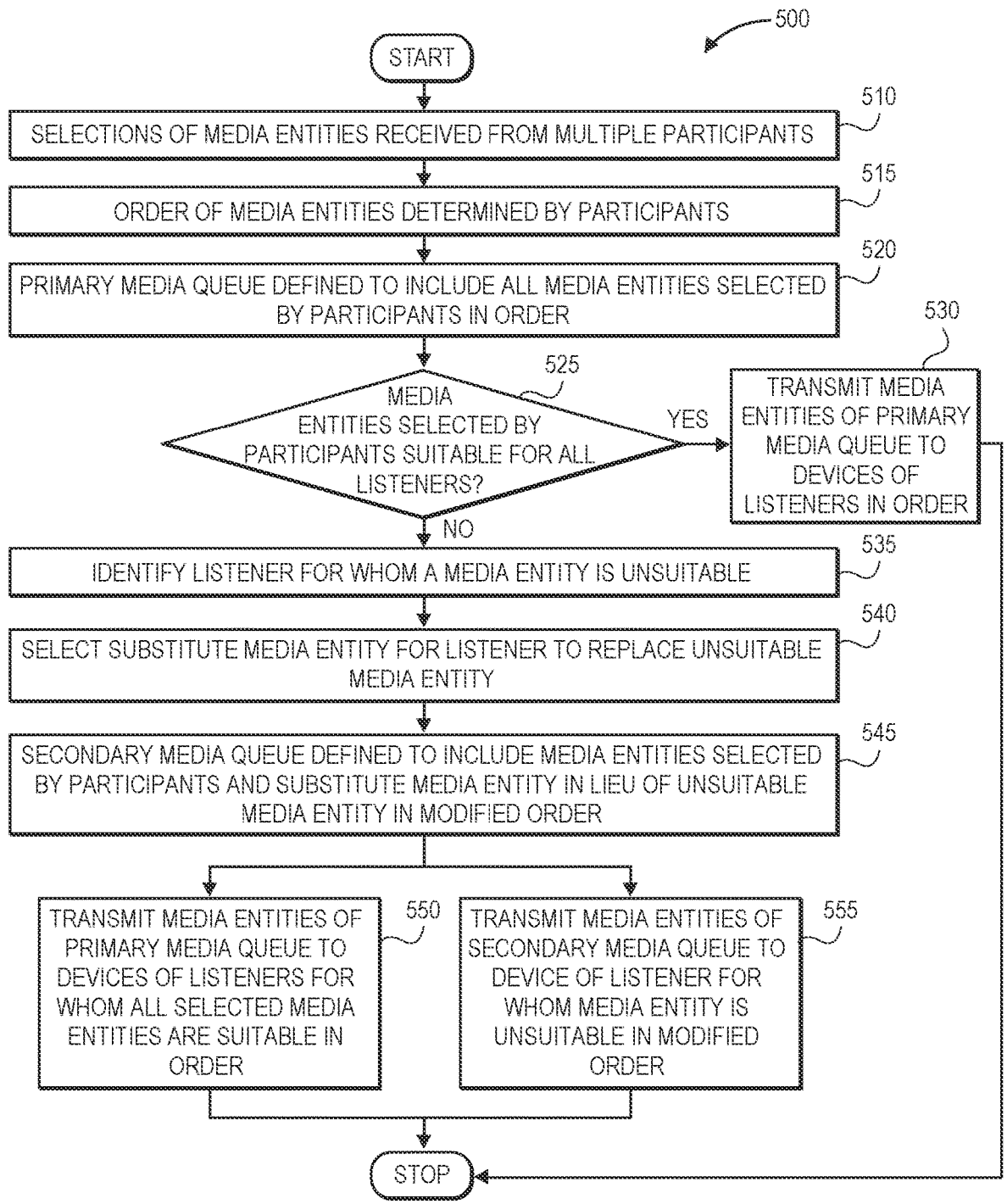
FIG. 5 is a flow chart of one process for generating media queues in accordance with embodiments of the present disclosure.

Referring to FIG. 5, a flow chart 500 of one process for generating media queues in accordance with embodiments of the present disclosure is shown. At box 510, selections of media entities are received from multiple participants. For example, participants may select media entities (e.g., songs) by one or more interactions with user interfaces rendered on displays of devices (e.g., touchscreen displays on mobile devices), by one or more spoken commands to a voice-enabled system (e.g., a smart speaker) configured to interpret speech, or in any other manner. In some implementations, one of the participants may invite other participants to provide selections or to otherwise participate in the generation of a media queue for any reason and for any purpose, such as a party, a gathering, an event, or any other occurrence, that may be attended by or associated with any number of other listeners who are not participants in the generation of the media queue.

Selections may be received from any number of participants in a group, including all of the participants in the group, or as few as one or two of the participants in the group.

At box 515, an order of the selected media entities is determined by the participants. For example, in some implementations, after selections of media entities are received from multiple participants at box 510, participants of a group may be prompted to vote for or designate their preferred orders in which the media entitles are to be played in accordance with the queue. A prompt may be provided to the participants of the group via one or more user interfaces rendered on devices of the respective participants, who may vote for or designate their preferred orders by one or more gestures or other interactions with a touchscreen display or any other input/output ("I/O") device.

Alternatively, an order of the selected media entities may be selected by the participants in any other manner, e.g., manually, automatically or at random, such as by a control system.

At box 520, a primary media queue is defined to include all of the media entities selected by the participants, in the order determined by the participants at box 515. For example, the media entities selected by the participants may be identified and stored, in the order determined at box 515, in a record maintained in one or more data stores associated with a control system, or any other computer device or system in communication with one or more devices of the participants. The primary media queue may be designated as a default media queue for any of the participants and any listeners in a group.

At box 525, whether all of the media entities selected by the participants are suitable for all of the listeners to the media queue, which may include any number of the participants, is determined. Suitability of media entities for listeners may be determined in any manner in accordance with implementations of the present disclosure. For example, access levels or other information regarding each of the listeners may be determined. Such access levels may include authorizations to access a streaming service from which one or more of the media entities may be obtained, or a data store or computer device on which one or more of the media entities may be stored. Alternatively, or additionally, identifiers of the media entities may be compared to lists of media entities that are known or believed to be preferred or favored by each of the listeners, in order to determine whether any of the media entities are not preferred or are disfavored by any of the listeners.

Moreover, in some implementations, a listener may permanently or temporarily designate his or her interest in media entities having a specific content rating, e.g., for kids, for teens, for young adults or for adults, or any other rating. For example, a media entity consistent with such a rating may be deemed suitable for a given listener, and a media entity that is not consistent with the rating may be deemed unsuitable for the same listener.

If all of the media entities selected by all of the participants at box 510 are suitable for all listeners, which may include any number of the participants, then the process advances to box 530, where the media entities of the primary media queue are transmitted to devices of the listeners in the order determined at box 515, and the process ends.

If one or more of the media entities is not suitable for any of the listeners, however, then the process advances to box 535, where a listener for whom the one or more media entities are not suitable is identified.

At box 540, a substitute media entity is selected for the listener to replace an unsuitable media entity. The substitute media entity may be selected in any manner and on any basis. For example, the substitute media entity may be a media entity to which the listener is known or believed to have access, or is known or believed to prefer or favor. The substitute media entity may be selected based on a frequency or a recency with which the listener listens or listened to the media entity, or a similarity to a media entity to which the listener frequently or recently listened. Alternatively, the substitute media entity may be selected in any other manner.

At box 545, a secondary media queue is defined to include the media entities selected by the participants at box 510, but with the substitute media entity selected at box 540 in lieu of the unsuitable media entity, in a modified order. For example, the secondary media queue may include the same order or sequence of media entities as the primary media queue defined at box 520, but with a media entity identified as unsuitable for a listener removed and replaced with a substitute media entity that has been identified as suitable for the listener. To the extent that the substitute media entity has a length or duration that is longer than a length or duration of the media entity that has been removed, the primary media queue may be modified as necessary, such as by inserting advertisements, delays or other audible information into the primary media queue, so that an overall length or duration of the primary media queue is the same as an overall length or duration of the secondary media queue. Conversely, to the extent that the media entity that has been removed from the primary media queue has a length or duration that is longer than a length or duration of the substitute media entity, the secondary media queue may be modified as necessary, such as by inserting advertisements, delays or other audible information therein so that an overall length or duration of the primary media queue is the same as an overall length or duration of the secondary media queue.

To the extent that multiple media entities in the primary media queue are identified as unsuitable to a listener, multiple substitute media entities may be identified, e.g., one substitute media entity for each media entity that has been identified as unsuitable, or a single substitute media entity for multiple media entities that have been identified as unsuitable. Where a single media entity in the primary media queue is deemed unsuitable to two or more listeners, a single substitute media entity that is suitable to all of the listeners may be identified, and a single secondary media queue may be defined to include the single substitute media entity in lieu of the single media entity that has been deemed unsuitable. Alternatively, different substitute media entities may be identified for different listeners for whom a single media entity has been deemed unsuitable.

At box 550, media entities of the primary media queue are transmitted to devices of listeners for whom all of the media entities selected by listeners at box 510 are suitable, and in the order determined at box 515. In parallel, at box 555, media entities of the secondary media queue are transmitted to devices of listeners for whom a media entity has been identified as unsuitable, and in a modified order, as necessary, and the process ends.

Referring to FIGS. 6A through 6D, views of aspects of one system for generating media queues in accordance with embodiments of the present disclosure are shown. Except where otherwise noted, reference numerals preceded by the number "6" shown in FIGS. 6A through 6D indicate components or features that are similar to components or features having reference numerals preceded by the number "4"

shown in FIGS. 4A through 4G, by the number "2" shown in FIG. 2A or FIG. 2B or by the number "1" shown in FIGS. 1A through 1J.

Figure 6A:
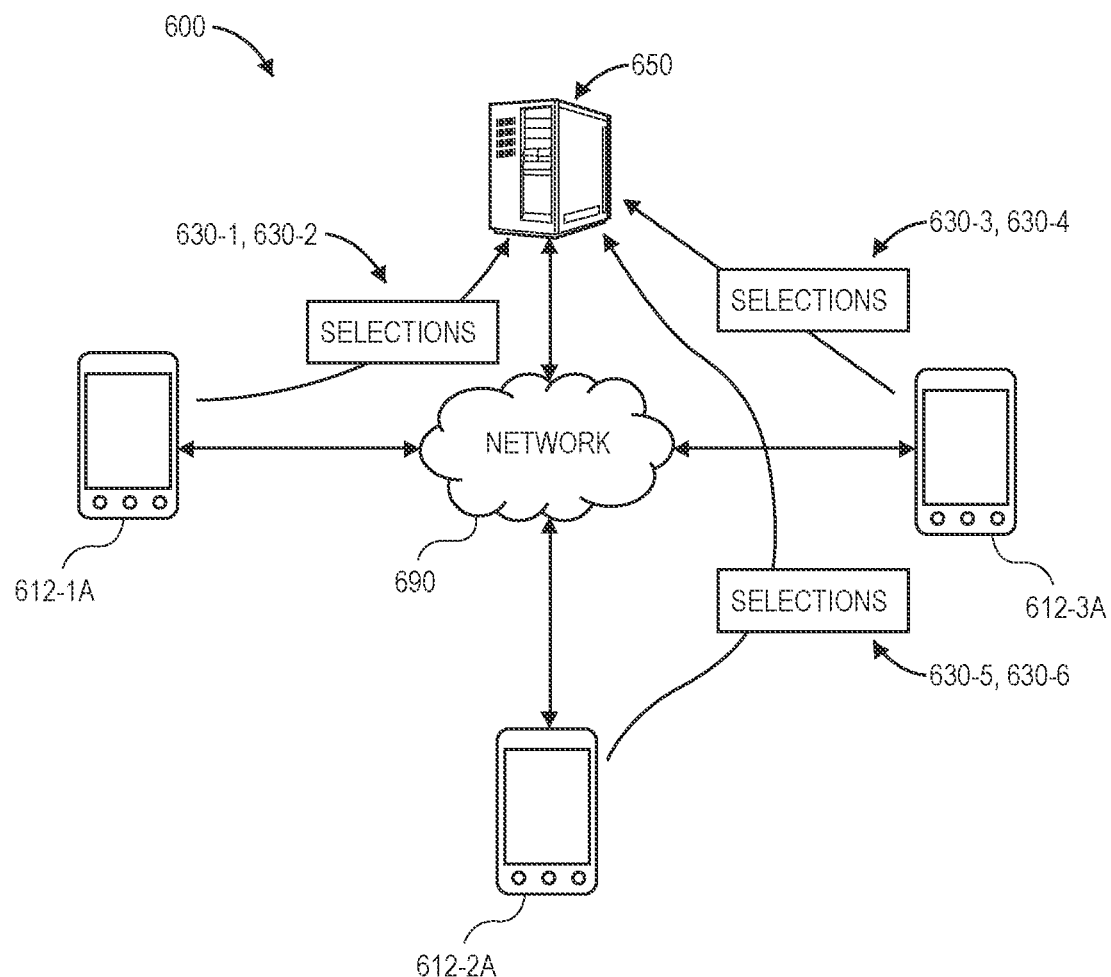
FIGS. 6A through 6D are views of aspects of one system for generating media queues in accordance with embodiments of the present disclosure.

As is shown in FIG. 6A, a system 600 includes mobile devices 612-1A, 612-2A, 612-3A of participants and a control system 650 that are connected to one another over one or more networks 690, which may include the Internet in whole or in part. Alternatively, or additionally, the system 600 may further include any devices or systems associated with sources of content, or any devices or systems of listeners who are not participants in the generation of a media queue.

As is also shown in FIG. 6A, the control system 650 receives selections of a media entity 630-1, the song "Old Town Road" by Lil Nas X, having a length or duration of two minutes, thirty-seven seconds, and a media entity 630-2, the song "Uptown Funk," by Mark Ronson and Bruno Mars, having a length or duration of three minutes, fifty-five seconds, from the mobile device 612-1A. The control system 650 also receives selections of a media entity 630-3, the song "Perfect" by Ed Sheeran, having a length or duration of four minutes, nineteen seconds, and a media entity 630-4, the song "Without Me" by Halsey, having a length or duration of three minutes, twenty-one seconds, from the mobile device 612-3A. The control system 650 further receives selections of a media entity 630-5, the song "Hello" by Adele, having a length or duration of four minutes, fifty-five seconds, and a media entity 630-4, the song "Radioactive" by Imagine Dragons, having a length or duration of three minutes, seven seconds, from the mobile device 612-2A.

The selections of the media entities 630-1 through 630-6 may be made in any manner on the respective mobile devices 612-1A, 612-2A, 612-3A, such as by interactions with one or more user interfaces rendered on displays of the respective mobile devices 612-1A, 612-2A, 612-3A, by uttering one or more voice commands that are captured and interpreted by the respective mobile devices 612-1A, 612-2A, 612-3A, or in any other manner.

Figure 6B:
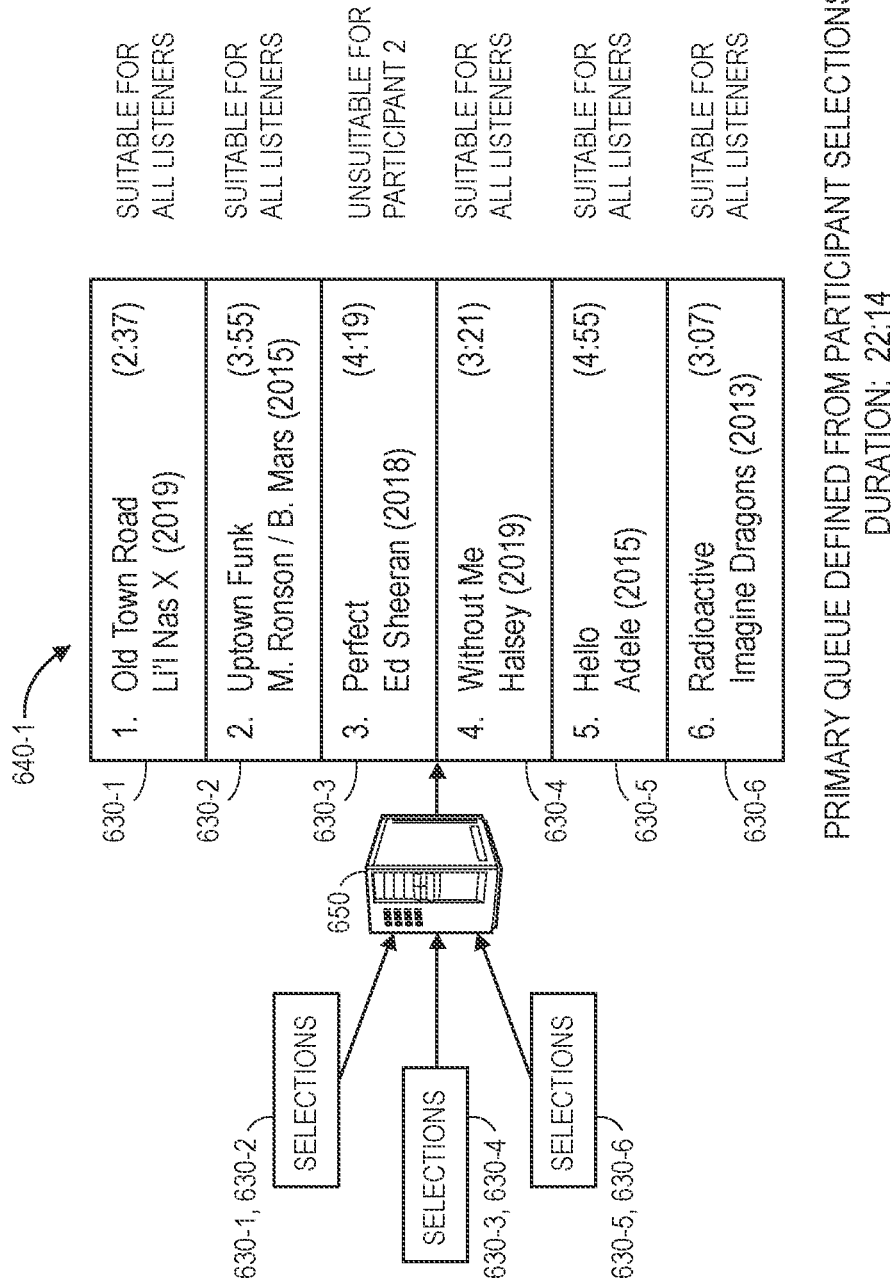

As is shown in FIG. 6B, upon receiving the selections of the media entities 630-1 through 630-6 from the mobile devices 612-1A, 612-2A, 612-3A, the control system 650 generates a primary media queue 640-1 of the media entities 630-1 through 630-6, in an order that may be determined by participants operating the mobile devices 612-1A, 612-2A, 612-3A, by the control system 650, or in any other manner. The primary queue 640-1 has an overall length or duration of twenty-two minutes and fourteen seconds.

As is further shown in FIG. 6B, the suitability of each of the media entities 630-1 through 630-6, is determined for intended listeners to the primary queue 640-1, which may include one or more of the participants operating the mobile devices 612-1A, 612-2A, 612-3A, or any others. In particular, the media entities 630-1, 630-2, 630-4, 630-5, 630-6 have been identified as suitable for all listeners, and the media entity 630-3 has been identified as unsuitable for the participant operating the mobile device 612-2A, but suitable for all other listeners.

Figure 6C:
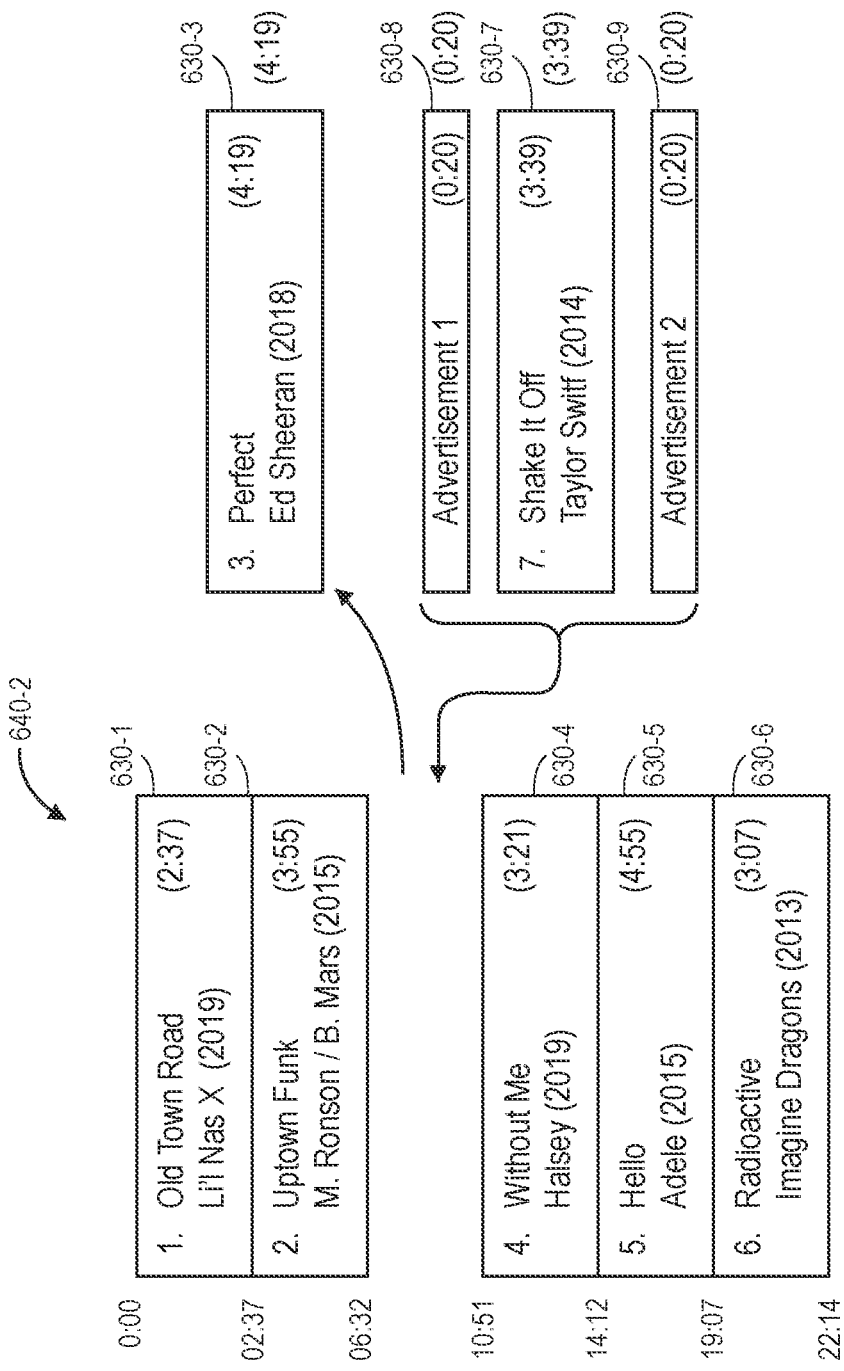

As is shown in FIG. 6C, a secondary media queue 640-2 may be defined based on the primary queue 640-1 of FIG. 6B, but with the media entity 630-3 that has been identified as unsuitable for the participant operating the mobile device 612-2A removed therefrom. As is shown in FIG. 6C, a media entity 630-7, e.g., the song "Shake it Off," by Taylor Swift, having a duration of three minutes, thirty-nine seconds, replaces the media entity 630-3 in the secondary media queue 640-2. In some implementations, the media entity 630-7 may be selected as an alternate media entity by one or more of the participants, e.g., the participant operating the mobile device 612-3A that selected the media entity 630-3. In some other implementations, the media entity 630-7 may be selected automatically, e.g., as a substitute media entity, based on information or data that may be known regarding the participant operating the mobile device 612-2A, such as his or her preferences or permissions. Alternatively, the media entity 630-7 may be identified in any other manner.

Furthermore, as is also shown in FIG. 6C, because the duration of the media entity 630-7 is forty seconds less than the duration of the media entity 630-3, audio content that is approximately forty seconds in duration must be added to the secondary queue 640-1 to ensure that the overall duration of the secondary queue 640-2 remains twenty-two minutes, fourteen seconds, and that media entities of the primary queue 640-1 and the secondary queue 640-2 may be played in a synchronized manner by different devices, such that the media entities 630-1, 630-2, 630-4, 630-5, 630-6 begin and end at the same time on the different devices.

For example, as is shown in FIG. 6C, a media entity 630-8 in the form of a first advertisement is added to the secondary queue 640-2 between an end of the media entity 630-2 and a start of the media entity 630-7. Similarly, a media entity 630-9 in the form of a second advertisement is added to the secondary queue 640-2 between an end of the media entity 630-7 and a start of the media entity 630-6. Thus, the overall length or duration of the secondary queue 640-2, with the media entities 630-8, 630-7, 630-9 inserted in lieu of the media entity 630-3, is the same as the overall length or duration of the primary queue 640-1. Alternatively, any media content having a net duration of forty seconds may be added to the secondary queue 640-2, prior to or following the media entity 630-7, to ensure that the primary queue 640-1 and the secondary queue 640-2 may be played in a synchronized manner by different devices.

Figure 6D:
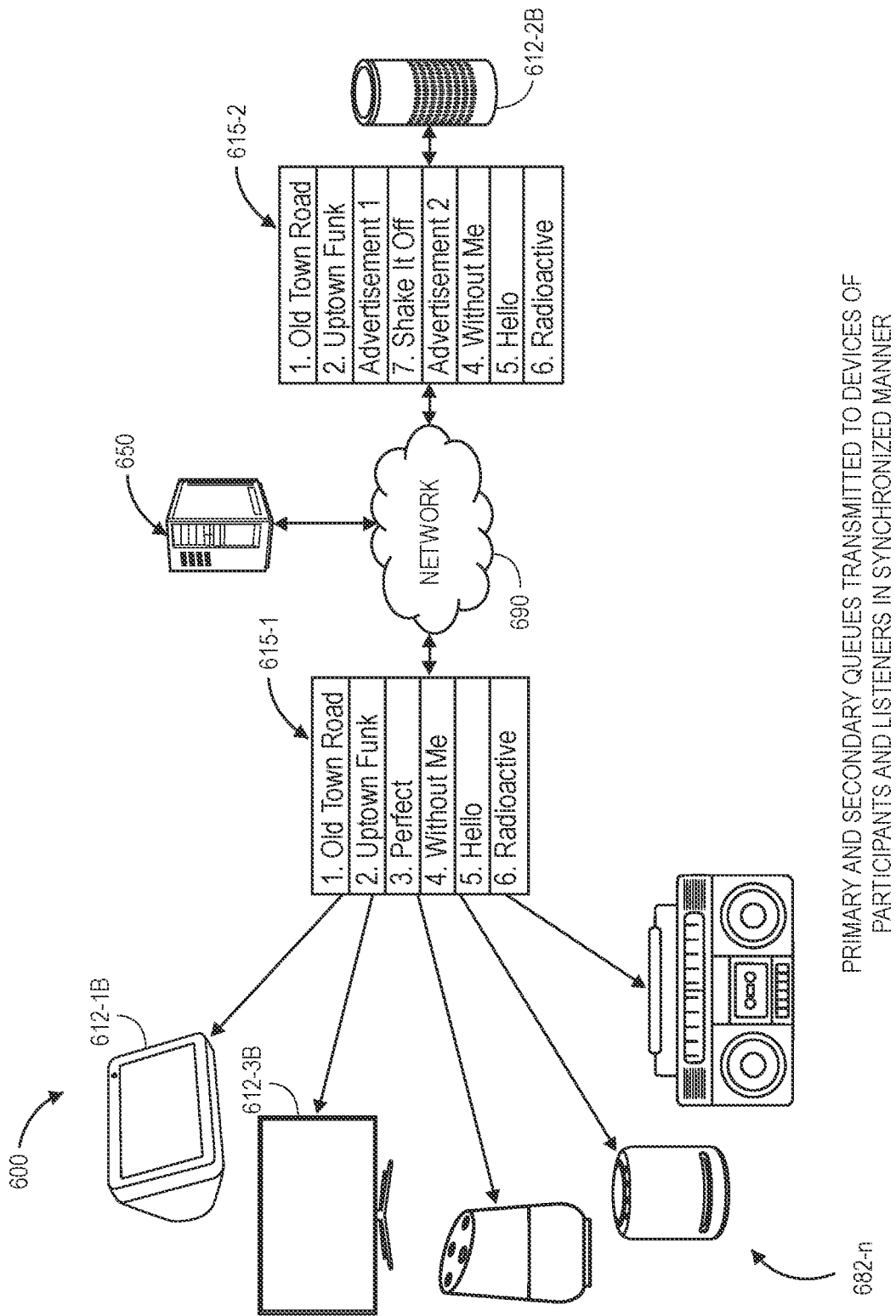

As is shown in FIG. 6D, the media entities 630-1 through 630-6 of the primary queue 640-1 are transmitted to a device 612-1B and a device 612-3B, each of which may be associated with participants that operated the mobile devices 612-1A, 612-3A, respectively. Alternatively, or additionally, the media entities 630-1 through 630-6 of the primary queue 640-1 may be transmitted to devices of any listeners, other than the mobile devices 612-1A, 612-3A. The media entities 630-1, 630-2, 630-9, 630-7, 630-8, 630-4, 630-5, 630-6 of the secondary queue 640-2 may be transmitted to a device 612-2B, which may be associated with the participant that operated the mobile device 612-2A, or to devices of any listeners for whom the media entity 630-3 is unsuitable, in a synchronized manner with the primary queue 640-1. For example, where the playing of the primary queue 640-1 by the devices 612-1B, 612-3B begins at the same time as the playing of the secondary queue 640-2 by the device 612-2B, the playing of the primary queue 640-1 and the playing of the secondary queue 640-2 will end at the same time.

Figure 7:
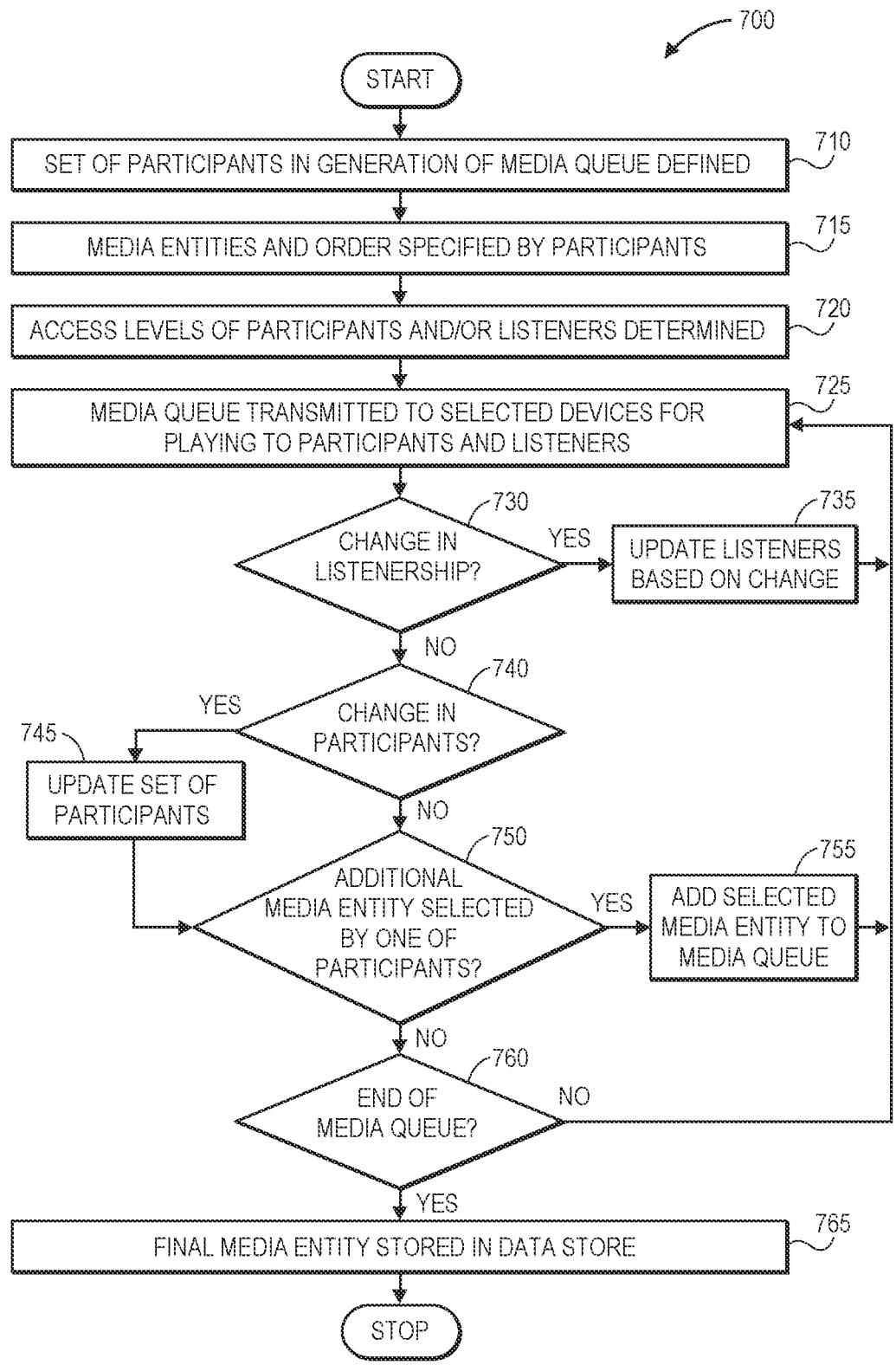
FIG. 7 is a flow chart of one process for generating media queues in accordance with embodiments of the present disclosure.

Referring to FIG. 7, a flow chart 700 of one process for generating media queues in accordance with embodiments of the present disclosure is shown.

At box 710, a set of participants in the generation of a media queue is defined. For example, the media queue may be intended for an event or occasion, e.g., a party, and the set of participants may be identified or selected by an organizer of the event or occasion, who may also be one of the set of participants. Alternatively, the set of participants may be defined in any other manner and on any other basis.

At box 715, media entities and an order of the media entities are specified by the participants. For example, selections of media entities may be received from devices associated with any of the set of participants, such as in response to interactions with user interfaces rendered by such devices, or one or more voice commands, or in any other manner. The order of the media entities in the media queue may be selected by one or more of the set of participants, or by all of the participants, such as by voting, or in any other manner (e.g., at random).

At box 720, access levels of the participants and any intended listeners to the media queue are determined. The access levels may relate to subscriptions to media streaming services, access to one or more data stores or other machines on which media entities are stored, or access to any other sources of media.

At box 725, media entities of the media queue are transmitted to selected devices for playing to the participants and any listeners. For example, where the media queue is associated with an event or occasion, the media entities may be transmitted to one or more devices associated with any of the participants or any of the listeners at a designated or predetermined start time of the event or the occasion. The selected devices may include one or more of the devices from which the media entities were selected or the order was specified by the participants, or any other devices of the participants or any listeners. In some implementations, the media queue may be transmitted to a single device for playing to all of the participants or any listeners. In some other implementations, however, the media queue may be transmitted to multiple devices, each associated with any number of participants or listeners, which may be separated from one another by any distances, or are not in a common location.

In some implementations, the media entities the media queue may be transmitted to the selected devices in accordance with the media queue and without interruption. In some other implementations, however, the media entities, an order of the media queue, or the selected devices may be modified while the media entities are being played by the selected devices.

For example, at box 730, whether there has been a change in listenership is determined. For example, a listener who was not previously listening to the media queue may request to do so, e.g., to one or more of the participants. Alternatively, one or more listeners who was previously listening to the media queue may depart from a location of one of the selected devices, or may decline to continue listening to the media queue.

If there has been a change in listenership, then the process advances to box 735, where the listeners are updated based on the change, before returning to box 725, where the media queue is transmitted to the selected devices.

If there has not been a change in listenership, then the process advances to box 740, where whether there has been a change in the set of participants is determined. For example, one or more participants in the set may decline to remain participants, or may be removed as participants, such as where a single participant names multiple participants to generate a media queue and then, after the media queue has been transmitted to participants and listeners, may elect to reduce the set of participants to include only himself or herself, or fewer than all of the participants that originally generated the media queue. Alternatively, one or more participants may be added to the set of participants for any reason, and may be granted permission to add media entities to the media queue, remove media entities from the media queue, or modify the order of media entities in the media queue. In some implementations, one or more participants removed from the set of participants may remain as listeners to the media queue. In some other implementations, one or more listeners may be added as participants to the set of participants.

If there has been a change in the set of participants, then the process advances to box 745, where the set of participants is updated based on the change.

After the set of participants has been updated at box 745, or if there has been no change in the set of participants, then the process advances to box 750, where whether an additional media entity is selected by one of the set of participants is determined.

If an additional media entity has been selected by one of the set of participants, then the process advances to box 755, where the selected media entity is added to the media queue, before returning to box 725, where the media queue is transmitted to the selected devices. Alternatively, in some implementations, a participant may remove a media entity from the media queue, or change an order of media entities in the media queue that have yet to be played.

If no additional media entities have been added to the media queue by any of the set of participants, then the process advances to box 760, where whether an end of the media queue has been reached is determined.

If the end of the media queue has not yet been reached, then the process returns to box 725, where the media queue is transmitted to the selected devices. If the end of the media queue has been reached, however, then the process advances to box 765, where the final media entity is stored in one or more data stores, and the process ends. For example, the media queue that was played at an event or occasion may be saved and shared for subsequent playing, e.g., by one or more of the participants or listeners, or any other individuals or entities, at a later time. Alternatively, in some implementations, after an end of a media queue has been reached, the media queue may be deleted, erased or otherwise disregarded.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be added to media queues and transmitted to or played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 3, 5 or 7, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two rightmost digits of a reference number in a figure indicate a component or a feature that is similar to components or features having reference numbers with the same two rightmost digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A first computer system comprising at least one data store and at least one computer processor,
   wherein the first computer system is connected to one or more networks, and
   wherein the at least one data store has one or more sets of instructions stored thereon that, when executed by the at least one computer processor, cause the first computer system to perform a method comprising:
      receiving information regarding a first plurality of songs from a second computer system associated with a first individual, wherein the first individual is one of a plurality of participants;
      receiving information regarding a second plurality of songs from a third computer system associated with a second individual, wherein the second individual is one of the plurality of participants;
      identifying sources of each of a third plurality of songs, wherein each of the third plurality of songs is one of the first plurality of songs or the second plurality of songs;
      determining that the first individual is authorized to access each of the third plurality of songs;
      identifying a level of access associated with a first song of the first plurality of songs;
      determining that the second individual does not have the level of access associated with the first song of the first plurality of songs;
      causing a display of a user interface on a display of the third computer system, wherein the user interface comprises information regarding the level of access associated with the first song of the first plurality of songs, and wherein the information regarding the level of access indicates that the second individual does not have the level of access associated with the first song of the first plurality of songs;
      transmitting information regarding the third plurality of songs to the second computer system;
      after causing the display of the first user interface on the display of the second computer system,
         receiving, by the first computer system from the third computer system, a selection of a second song by the second individual;
      receiving information regarding a first order of the third plurality of songs from the second computer system, wherein the first order includes at least some of the third plurality of songs in a sequence selected by the first individual;

receiving information regarding a second order of a fourth plurality of songs from the third computer system, wherein the fourth plurality of songs comprises the first plurality of songs and the second song, and wherein the second order includes at least some of the fourth plurality of songs in a sequence selected by the second individual;

determining a third order of the third plurality of songs based at least in part on the information regarding the first order and the information regarding the second order;

transmitting data representing the third plurality of songs to a fourth computer system, wherein the fourth computer system is associated with the first individual;

causing at least the third plurality of songs to be played by the fourth computer system in the third order;

transmitting data representing the fourth plurality of songs to a fifth computer system, wherein the fifth computer system is associated with the second individual; and causing at least the fourth plurality of songs to be played by the fifth computer system in the second order.

2. The first computer system of claim 1, wherein the fourth computer system is at least a portion of one of:
an automobile;
a desktop computer;
a laptop computer;
a mobile device;
a smart speaker;
a television; or
a wristwatch.

3. The first computer system of claim 1, wherein the level of access associated with the first song is based at least in part on at least one of:
a subscription to a service by which the first song may be received; or
access to a data store on which the first song is stored.

4. The first computer system of claim 1, wherein the fifth computer system is at least a portion of one of:
an automobile;
a desktop computer;
a laptop computer;
a mobile device;
a smart speaker;
a television; or
a wristwatch.

5. The first computer system of claim 1, wherein the first song is on a first album, by a first artist, or by a first group, and
wherein the second song is a version of the first song on a second album, by a second artist, or by a second group.

6. A method comprising:
receiving, by a first computer system from a second computer system, a selection of a first media entity by a first participant, wherein the second computer system is associated with the first participant;

receiving, by the first computer system from a third computer system, a selection of a second media entity by a second participant, wherein the third computer system is associated with the second participant;

determining, by the first computer system, a first order of a first plurality of media entities, wherein the first plurality of media entities comprises the first media entity and the second media entity;

identifying, by the first computer system, a level of access associated with the first media entity;

determining, by the first computer system, that the second participant does not have the level of access associated with the first media entity;

in response to determining that the second participant does not have the level of access associated with the first media entity,
causing a display of a first user interface on a display of the second computer system, wherein the first user interface comprises information regarding the first media entity, and wherein the information regarding the first media entity indicates that the second participant does not have the level of access associated with the first media entity;

after causing the display of the first user interface on the display of the second computer system,
receiving, by the first computer system from the second computer system, a selection of a third media entity by the first participant;

determining, by the first computer system, a level of access associated with the third media entity;

determining, by the first computer system, that the second participant has the level of access associated with the third media entity;

in response to determining that the second participant has the level of access associated with the third media entity,
determining, by the first computer system, a second order of a second plurality of media entities, wherein the second plurality of media entities comprises the third media entity and the second media entity;

generating, by the first computer system, a first queue of the first plurality of media entities in the first order;

generating, by the first computer system, a second queue of the second plurality of media entities in the second order;

transmitting, by the first computer system to at least a fourth computer system, data for causing the first plurality of media entities to be played in accordance with the first queue; and transmitting, by the first computer system to at least a fifth computer system, data for causing the second plurality of media entities to be played in accordance with the second queue, wherein the fourth computer system is associated with the first participant,
wherein the fifth computer system is associated with the second participant,
wherein the fourth computer system is in a location of the first participant, and
wherein the fifth computer system is in a location of the second participant.

7. The method of claim 6, further comprising:
causing a display of a second user interface on the display of the second computer system, wherein the second user interface comprises information regarding a second plurality of media entities, wherein the first media entity is one of the second plurality of media entities, and wherein the selection of the first media entity is received via the second user interface; and causing a display of a third user interface on a display of the third computer system, wherein the third user interface comprises information regarding a third plurality of media entities, wherein the second media entity is one of the third plurality of media entities, and wherein the selection of the second media entity is received via the third user interface.

8. The method of claim 6, wherein determining the first order of the first plurality of media entities comprises:
transmitting, by the first computer system to at least the second computer system and third computer system, information regarding the first plurality of media entities; and
receiving, by the first computer system from the second computer system, information regarding a second order for at least a portion of the first plurality of media entities, wherein the second order is selected by the first participant,
wherein the first order of the first plurality of media entities is determined based at least in part on the information regarding the second order.

9. The method of claim 8, further comprising:
causing a display of a second user interface on a display of the second computer system, wherein the second user interface comprises information regarding the first plurality of entities, wherein the first participant provided the information regarding the second order by at least one interaction with the second user interface.

10. The method of claim 6, wherein the data for causing the first plurality of media entities to be played in accordance with the first queue is transmitted at a first time,
wherein the data for causing the second plurality of media entities to be played in accordance with the second queue is transmitted at approximately the first time,
wherein the fourth computer system and fifth computer system are not in a common location at the first time.

11. The method of claim 6, wherein the level of access associated with the first media entity is based at least in part on at least one of:
a subscription to a service by which the first media entity may be received; or
access to a data store on which the first media entity is stored.

12. The method of claim 6, wherein the fourth computer system is at least a portion of one of:
an automobile;
a desktop computer;
a laptop computer;
a mobile device;
a smart speaker;
a television; or
a wristwatch.

13. The method of claim 6, wherein the first media entity is one of:
an album;
media content by an artist;
media content by a group;
media content of a producer;
media content of a service;
a movie;
a playlist;
a podcast;
a song;
a soundtrack; or
a television show.

14. The method of claim 6, further comprising:
determining a duration of the first media entity;
determining a duration of the second media entity; and
at least one of:
modifying the first queue based at least in part on the duration of the first media entity and the duration of the second media entity; or generating the second queue based at least in part on the duration of the first media entity and the duration of the second media entity,
wherein a duration of the first queue is approximately equal to a duration of the second queue.

15. A method comprising:
receiving, by a first computer system from a second computer system, identifiers of a plurality of individuals;
transmitting, by the first computer system, electronic messages to a plurality of computer systems, wherein each of the plurality of computer systems is associated with one of the plurality of individuals, and wherein each of the electronic messages comprises an invitation to participate in generating a media queue;
receiving, by the first computer system, selections of a plurality of songs, wherein each of the selections of the plurality of songs is received from one of the plurality of computer systems;
transmitting, by the first computer system, information regarding the selections of the plurality of songs to the plurality of computer systems;
receiving, by the first computer system from at least some of the plurality of computer systems, information regarding orders of songs, wherein each of the orders includes at least some of the plurality of songs, and wherein each of the orders is selected by one of the plurality of individuals;
generating, by the first computer system, a first media queue comprising at least a first subset of the plurality of songs in a first order determined based at least in part on the information regarding the orders of songs received by the first computer system, wherein the first subset of the plurality of songs comprises a first song;
determining, by the first computer system, that at least one of a first individual of the plurality of individuals or a second computer system of the plurality of computer systems is not authorized to access the first song, wherein the second computer system is associated with the first individual;
causing a display of a user interface on a display of the second computer system, wherein the user interface comprises information regarding the first song, and wherein the information regarding the first song indicates that the first individual is not authorized to access the first song;
after causing the display of the first user interface on the display of the second computer system,
receiving, by the first computer system from the second computer system, a selection of a second song by the first individual;
generating, by the first computer system, a second media queue comprising at least a second subset of the plurality of songs in a second order determined based at least in part on the information regarding the orders of songs received by the first computer system, wherein the second subset of the plurality of songs comprises the second song and does not comprise the first song;
transmitting, by the first computer system, the first subset of the plurality of songs in accordance with the first media queue to at least one computer system associated with at least one of the plurality of individuals, wherein the at least one computer system does not include the second computer system; and
transmitting, by the first computer system to the second computer system, the second subset of the plurality of songs in accordance with the second media queue.

16. The method of claim 15, further comprising:
determining a duration of the first song;
determining a duration of the second song; and
at least one of:
- modifying the first media queue based at least in part on the duration of the first song and the duration of the second song; or
- generating the second media queue based at least in part on the duration of the first song and the duration of the second song, wherein a duration of the first media queue is approximately equal to a duration of the second media queue.

17. The method of claim 15, wherein the second computer system is at least a portion of one of:
an automobile;
a desktop computer;
a laptop computer;
a mobile device;
a smart speaker;
a television; or
a wristwatch.

18. The method of claim 15, wherein authorization to access the first song is based at least in part on at least one of:
- a subscription to a service by which the first song may be received; or
- access to a data store on which the first song is stored.

19. The method of claim 15, wherein the first song is on a first album, by a first artist, or by a first group, and
- wherein the second song is a version of the first song on a second album, by a second artist, or by a second group.

20. The method of claim 6, wherein the first media entity is a first song on a first album, by a first artist, or by a first group, and
- wherein the second media entity is a second song,
- wherein the second song is a version of the first song on a second album, by a second artist, or by a second group.

* * * * *